US011769489B2

(12) United States Patent
Lee et al.

(10) Patent No.: US 11,769,489 B2
(45) Date of Patent: Sep. 26, 2023

(54) ELECTRONIC DEVICE AND METHOD FOR PERFORMING SHORTCUT COMMAND IN ELECTRONIC DEVICE

(71) Applicant: Samsung Electronics Co., Ltd., Suwon-si (KR)

(72) Inventors: Yoonju Lee, Suwon-si (KR); Gajin Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 17/495,243

(22) Filed: Oct. 6, 2021

(65) Prior Publication Data

US 2022/0238099 A1    Jul. 28, 2022

Related U.S. Application Data

(63) Continuation of application No. PCT/KR2021/013494, filed on Oct. 1, 2021.

(30) Foreign Application Priority Data

Jan. 28, 2021 (KR) ......................... 10-2021-0012001

(51) Int. Cl.
*G10L 15/07* (2013.01)
*G10L 15/30* (2013.01)
*G10L 15/22* (2006.01)

(52) U.S. Cl.
CPC .............. *G10L 15/07* (2013.01); *G10L 15/22* (2013.01); *G10L 15/30* (2013.01); *G10L 2015/223* (2013.01)

(58) Field of Classification Search
USPC ................................................... 704/1–504
See application file for complete search history.

(56) References Cited

U.S. PATENT DOCUMENTS 6,385,610 B1 * 5/2002 Deffler ................ G06F 9/466
707/999.102
2005/0217459 A1 * 10/2005 Murakoshi .............. G06F 16/40
707/E17.101

(Continued)

FOREIGN PATENT DOCUMENTS

KR     2001-0106514 A    11/2001
KR   10-2007-0106488 A    11/2007

(Continued)

OTHER PUBLICATIONS

International Search Report dated Dec. 20, 2021, issued in International Application No. PCT/KR2021/013494.

*Primary Examiner* — Marcus T Riley
(74) *Attorney, Agent, or Firm* — Jefferson IP Law, LLP

(57) ABSTRACT

An electronic device is provided. The electronic device includes a memory for storing at least one dynamic shortcut command, a display, and a processor operatively connected with the memory and the display, the processor configured to store a first dynamic shortcut command including first type information for at least one first dynamic variable word in the memory, when acquiring a user utterance, detect the first dynamic shortcut command in the memory based on the first dynamic variable word included the user utterance, change the first type information included in the detected first dynamic shortcut command into the first dynamic variable word included in the user utterance, and execute a task corresponding to the changed first dynamic shortcut command including the first dynamic variable word included in the user utterance. Various other embodiments may be provided. The method performing shortcut command in the electronic device may be performed using an artificial intelligence model.

15 Claims, 17 Drawing Sheets

(56) References Cited

U.S. PATENT DOCUMENTS

| | | | | |
|---|---|---|---|---|
| 2013/0311997 A1* | 11/2013 | Gruber | ................ | G06F 9/5005 |
| | | | | 718/102 |
| 2015/0348551 A1* | 12/2015 | Gruber | ............... | G10L 15/1822 |
| | | | | 704/235 |
| 2016/0240189 A1* | 8/2016 | Lee | ......................... | G10L 15/22 |
| 2018/0240461 A1* | 8/2018 | Jung | ...................... | G10L 15/22 |
| 2018/0322872 A1* | 11/2018 | Cha | ......................... | G10L 15/22 |
| 2019/0066677 A1* | 2/2019 | Jaygarl | ................... | G06F 40/30 |
| 2019/0103103 A1* | 4/2019 | Ni | ........................... | G10L 15/30 |
| 2019/0260866 A1* | 8/2019 | Choi | ................ | H04M 1/72469 |
| 2020/0035238 A1* | 1/2020 | Jung | ...................... | G10L 15/22 |
| 2022/0238099 A1* | 7/2022 | Lee | .................... | G10L 15/1822 |

FOREIGN PATENT DOCUMENTS

| | | |
|---|---|---|
| KR | 10-2008-0061750 A | 7/2008 |
| KR | 10-2014-0009687 A | 1/2014 |
| KR | 10-2017-0058664 A | 5/2017 |
| KR | 10-2018-0122106 A | 11/2018 |
| KR | 10-2019-0021143 A | 3/2019 |

\* cited by examiner

ELECTRONIC DEVICE AND METHOD FOR PERFORMING SHORTCUT COMMAND IN ELECTRONIC DEVICE

CROSS-REFERENCE TO RELATED APPLICATIONS

This application is a continuation application, claiming priority under § 365(c), of an International application No. PCT/KR2021/013494, filed on Oct. 1, 2021, which is based on and claims the benefit of a Korean Patent application number. 10-2021-0012001, filed on Jan. 28, 2021, in the Korean Intellectual Property Office, the disclosure of which is incorporated by reference herein in its entirety.

BACKGROUND

1. Field

The disclosure relates to an electronic device capable of dynamically executing shortcut commands and a method for performing shortcut commands by the electronic device.

2. Description of Related Art

Electronic devices have become a must-have item for everyone in the modern era. Users desire to receive various high-quality services anytime, anywhere using their electronic device.

The speech recognition service is a service that provides customers with various content services corresponding to the user's speech received based on a speech recognition interface implemented on electronic devices. In order to provide speech recognition services, the electronic devices are implemented with technologies that recognize and analyze human language (e.g., automatic speech recognition, natural language understanding, natural language generation, machine translation, dialogue system, question and answer, speech recognition and/or speech synthesis).

To provide a more convenient speech recognition service, a short command function is provided. Through the short command function, users may conveniently execute multiple commands by uttering a single phrase or word.

The above information is presented as background information only to assist with an understanding of the disclosure. No determination has been made, and no assertion is made, as to whether any of the above might be applicable as prior art with regard to the disclosure.

DETAILED DESCRIPTION OF THE DISCLOSURE

Technical Problem

The shortcut command function may generate a shortcut command including a shortcut command name including one word or phrase and a command to be executed when the shortcut command name is obtained by the user's utterance. However, shortcut commands need to be individually generated via the user's multiple input operations even when the shortcut commands have similar type information.

For example, to play songs of five singers the user likes, the user needs to generate five shortcut commands via multiple input operations.

Aspects of the disclosure are to address at least the above-mentioned problems and/or disadvantages and to provide at least the advantages described below. Accordingly, an aspect of the disclosure is to provide an electronic device capable of dynamically executing shortcut commands and a method for performing shortcut commands by the electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a memory for storing at least one dynamic shortcut command, a display, and a processor operatively connected with the memory and the display, the processor configured to store a first dynamic shortcut command including first type information for at least one first dynamic variable word in the memory, when acquiring a user utterance, detect the first dynamic shortcut command in the memory based on the first dynamic variable word included the user utterance, change the first type information included in the detected first dynamic shortcut command into the first dynamic variable word included in the user utterance, and execute a task corresponding to the changed first dynamic shortcut command including the first dynamic variable word included in the user utterance.

In accordance with another aspect of the disclosure, a method for performing a shortcut command by an electronic device is provided. The method includes storing a first dynamic shortcut command including first type information for at least one first dynamic variable word in memory of the electronic device when acquiring user utterance, detecting the first dynamic shortcut command in memory based on the first dynamic variable word included the user utterance, changing the first type information included in the detected first dynamic shortcut command into the first dynamic variable word included in the user utterance, and executing a task corresponding to the changed first dynamic shortcut command including the first dynamic variable word included in the user utterance.

Advantageous Effects

According to various embodiments, a shortcut command including type information is generated, and a shortcut command having the same type information is dynamically executed based on type information for a word included in a user utterance. Therefore, it is possible to reduce the hassle of registering a plurality of shortcut commands including each of words included in the type information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR CARRYING OUT THE DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
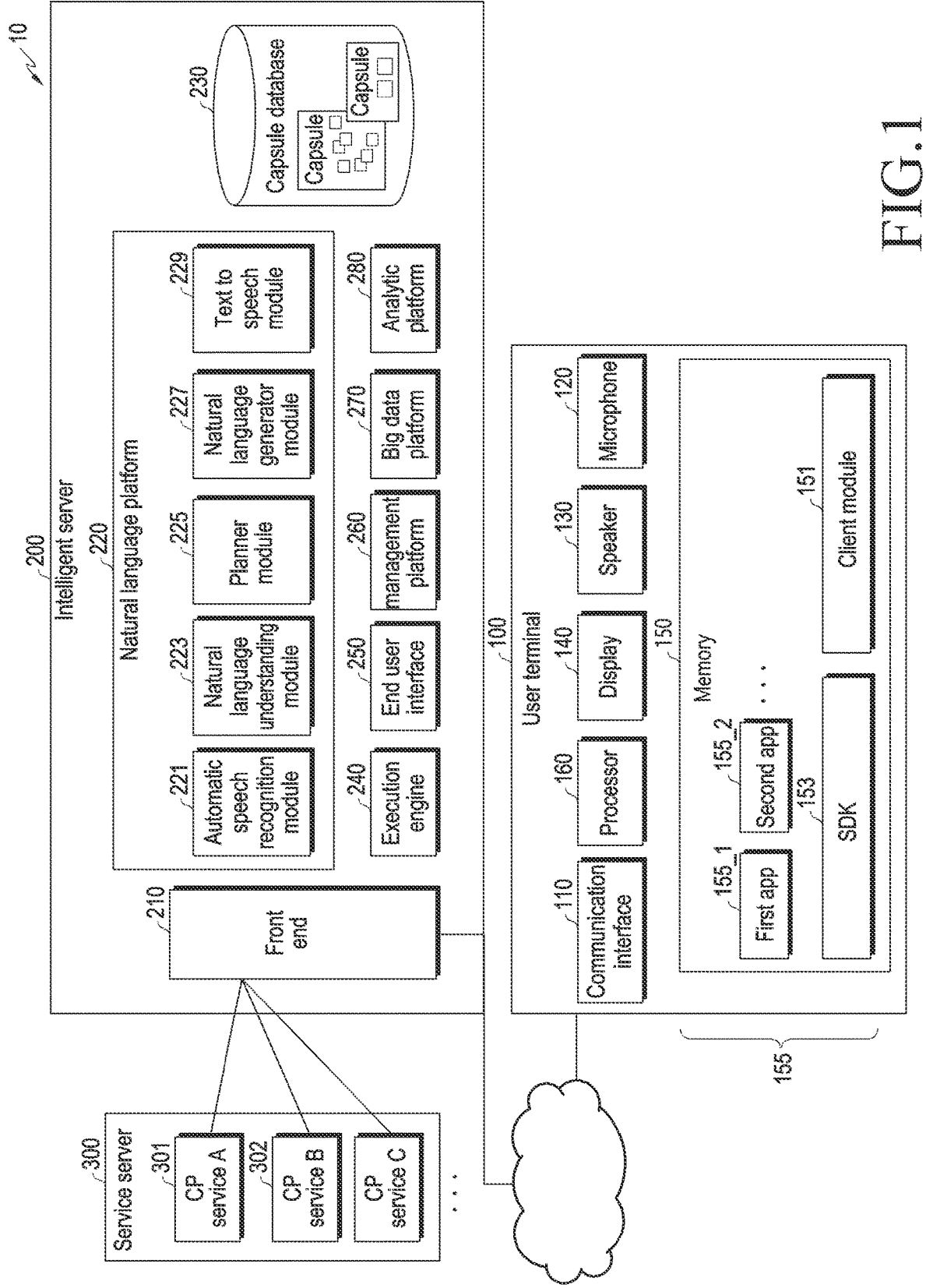
FIG. 1 is a block diagram illustrating an integrated intelligence system according to an embodiment of the disclosure.

FIG. 1 is a block diagram illustrating an integrated intelligence system according to an embodiment of the disclosure.

Referring to FIG. 1, an integrated intelligence system 10 according to an embodiment may include a user terminal 100, an intelligent server 200, and a service server 300.

The user terminal 100 according to an embodiment may be a terminal device (or an electronic device) capable of being connected to the Internet, and may include, for example, a mobile phone, a smart phone, a personal digital assistant (PDA), a notebook computer, a TV, white goods, a wearable device, a helmet mounted display (HMD), or a smart speaker.

According to the embodiment, the user terminal 100 may include a communication interface 110, a microphone 120, a speaker 130, a display 140, a memory 150, or a processor 160. The listed elements may be operatively or electrically connected to each other.

The communication interface 110 according to an embodiment may be connected to an external device and configured to transmit and receive data. The microphone 120 according to an embodiment may receive a sound (for example, a user utterance) and convert the same into an electrical signal. The speaker 130 according to an embodiment may output the electrical signal in the form of a sound (for example, voice). The display 140 according to an embodiment may be configured to display an image or a video. The display 140 according to an embodiment may display a graphic user interface (GUI) of an executed app (or application).

The memory 150 according to an embodiment may store a client module 151, a software development kit (SDK) 153, and a plurality of apps 155. The client module 151 and the SDK 153 may configure a framework (or a solution program) for performing a universal function. Further, the client module 151 or the SDK 153 may configure a framework for processing a voice input.

The plurality of apps 155 according to an embodiment may be programs for performing a predetermined function. According to an embodiment, the plurality of apps 155 may include a first app 155_1 and a second app 155_3. According to an embodiment, each of the plurality of apps 155 may include a plurality of operations for performing predetermined functions. For example, the apps may include an alarm app, a message app, and/or a schedule app. According to an embodiment, the plurality of apps 155 may be executed by the processor 160 so as to sequentially perform at least some of the plurality of operations.

The processor 160 according to an embodiment may control the overall operation of the user terminal 100. For example, the processor 160 may be electrically connected to the communication interface 110, the microphone 120, the speaker 130, and the display 140 and may perform predetermined operations.

The processor 160 according to an embodiment may perform a predetermined function by executing a program stored in the memory 150. For example, the processor 160 may perform the following operation for processing a voice input by executing at least one of the client module 151 or the SDK 153. The processor 160 may control, for example, the operation of the plurality of apps 155 through the SDK 153. The following operation which is the operation of the client module 151 or the SDK 153 may be performed by the processor 160.

The client module 151 according to an embodiment may receive a voice input. For example, the client module 151 may receive a voice signal corresponding to a user speech detected through the microphone 120. The client module 151 may transmit the received voice input to the intelligent server 200. The client module 151 may transmit state information of the user terminal 100 along with the received voice input to the intelligent server 200. The status information may be, for example, execution state information of the app.

The client module 151 according to an embodiment may receive the result corresponding to the received voice input. For example, if the intelligent server 200 obtains the result corresponding to the received voice input, the client module 151 may receive the result corresponding to the received voice input. The client module 151 may display the received result on the display 140.

The client module 151 according to an embodiment may receive a plan corresponding to the received voice input. The client module 151 may display the result obtained by performing the plurality of operations of the app on the display 140 according to the plan. The client module 151 may sequentially display, for example, the execution result of the plurality of operations on the display. In another example, the user terminal 100 may display results of only some of the plurality of operations (for example, the result of only the last operation) on the display.

According to an embodiment, the client module 151 may receive a request for acquiring information required for obtaining the result corresponding to the voice input from the intelligent server 200. According to an embodiment, the client module 151 may transmit the required information to the intelligent server 200 in response to the request.

The client module 151 according to an embodiment may transmit result information of the execution of the plurality of operations to the intelligent server 200 according to the plan. The intelligent server 200 may identify that the received voice input is correctly processed using the result information.

The client module 151 according to an embodiment may include a voice recognition module. According to an embodiment, the client module 151 may recognize a voice input for performing a limited function through the voice recognition module. For example, the client module 151 may perform an intelligent app for processing a voice input to perform an organic operation through a predetermined input (for example, wake up!).

The intelligent server 200 according to an embodiment may receive information related to a user voice input from the user terminal 100 through a communication network. According to an embodiment, the intelligent server 200 may change data related to the received voice input into text data. According to an embodiment, the intelligent server 200 may generate a plan for performing a task corresponding to the user voice input on the basis of the text data.

According to an embodiment, the plan may be generated by an artificial intelligence (AI) system. The intelligence system may be a rule-based system, a neural network-based system (for example, a Feedforward Neural Network (FNN)), or a Recurrent Neural Network (RNN)). Alternatively, the intelligence system may be a combination thereof or an intelligent system different therefrom. According to an embodiment, the plan may be selected from a combination of predefined plans or generated in real time in response to a user request. For example, the intelligence system may select at least one plan among from a plurality of predefined plans.

The intelligent server 200 according to an embodiment may transmit the result of the generated plan to the user terminal 100 or transmit the generated plan to the user terminal 100. According to an embodiment, the user terminal 100 may display the result of the plan on the display. According to an embodiment, the user terminal 100 may display the result of execution of operation according to the plan on the display.

According to an embodiment, the intelligent server 200 may include a front end 210, a natural language platform 220, a capsule database (DB) 230, an execution engine 240, an end user interface 250, a management platform 260, big data platform 270, and an analytic platform 280.

According to an embodiment, the front end 210 may receive the received voice input from the user terminal 100. The front end 210 may transmit a response to the voice input.

According to an embodiment, the natural language platform 220 may include an Automatic Speech Recognition module (ASR module) 221, a Natural Language Understanding module (NLU module) 223, a planner module 225, Natural Language Generator module (NLG module) 227, or a Text To Speech module (TTS module) 229.

The automatic speech recognition module 221 according to an embodiment may convert the voice input received from the user terminal 100 into text data. The natural language understanding module 223 according to an embodiment may detect a user's intention on the basis of text data of the voice input. For example, the natural language understanding module 223 may detect a user's intention by performing syntactic analysis or semantic analysis. The natural language understanding module 223 according to an embodiment may detect a meaning of a word extracted from the voice input on the basis of a linguistic characteristic of a morpheme or a phrase (for example, grammatical element) and match the detected meaning of the word and the intent so as to determine the user intent.

The planner module 225 according to an embodiment may generate a plan on the basis of the intention determined by the natural language understanding module 223 and a parameter. According to an embodiment, the planner module 225 may determine a plurality of domains required for performing a task on the basis of the determined intent. The planner module 225 may determine a plurality of operations included in the plurality of domains determined on the basis of the intent. According to an embodiment, the planner module 225 may determine a parameter required for performing the plurality of determined operations or a result value output by the execution of the plurality of operations. The parameter and the result value may be defined by a concept of a predetermined type (or class). According to an embodiment, the plan may include a plurality of operations determined by the user intent and a plurality of concepts. The planner module 225 may gradually (or hierarchically) determine the relationship between the plurality of operations and the plurality of concepts. For example, the planner module 225 may determine the execution order of the plurality of operations determined on the basis of the user intent based on the plurality of concepts. In other words, the planner module 225 may determine the execution order of the plurality of operations on the basis of the parameter required for performing the plurality of operations and the result output by the execution of the plurality of operations. Accordingly, the planner module 225 may generate a plan including information on the relationship (for example, ontology) between the plurality of operations and the plurality of concepts. The planner module 225 may generate a plan on the basis of information stored in the capsule database 230 corresponding to a set of relationships between concepts and operations.

The natural language generator module 227 according to an embodiment may change predetermined information in the form of text. The information converted into the form of text may be the form of a natural language speech. The text to speech module 229 may convert information in the form of text into information in the form of voice.

According to an embodiment, some or all of the functions of the natural language platform 220 may be performed by the user terminal 100.

The capsule database 230 may store information on the relationship between a plurality of concepts and operations corresponding to a plurality of domains. The capsule according to an embodiment may include a plurality of operation objects (action objects or action information) and concept objects (or concept information) included in the plan. According to an embodiment, the capsule database 230 may store a plurality of capsules in the form of a Concept Action Network (CAN). According to an embodiment, the plurality of capsules may be stored in a function registry included in the capsule DB 230.

The capsule database 230 may include a strategy registry storing strategy information required when a plan corresponding to a voice input is determined. When there are a plurality of plans corresponding to the voice input, the strategy information may include reference information for determining one plan. According to an embodiment, the capsule database 230 may include a follow up registry storing the following operation to suggest the following operation to the user in a predetermined situation. The following operation may include, for example, the following speech. According to an embodiment, the capsule database 230 may include a layout registry storing layout information which is information output through the user terminal 100. According to an embodiment, the capsule database 230 may include a vocabulary registry storing vocabulary information included in the capsule information. According to an embodiment, the capsule database 230 may include a dialogue registry storing information on dialogue (or interaction) with the user. The capsule database 230 may update the stored object through a developer tool. The developer tool may include a function editor for updating, for example, the operation object or the concept object. The developer tool may include a vocabulary editor for updating a vocabulary. The developer tool may include a strategy editor for generating and registering a strategy to determine a plan. The developer tool may include a dialogue editor for generating a dialogue with the user. The developer tool may include a follow up editor for activating the following goal and editing the following speech that provides a hint. The follow-up goal may be determined on the basis of the current goal, a user's preference, or an environment condition. According to an embodiment, the capsule database 230 may be implemented within the user terminal 100.

The execution engine 240 according to an embodiment may obtain the result on the basis of the generated plan. The end user interface 250 may transmit the obtained result to the user terminal 100. Accordingly, the user terminal 100 may receive the result and provide the received result to the user.

The management platform 260 according to an embodiment may manage information used by the intelligent server 200. The big data platform 270 according to an embodiment may collect user data. The analytic platform 280 according to an embodiment may manage Quality of Service (QoS) of the intelligent server 200. For example, the analytic platform 280 may manage elements and a processing speed (or efficiency) of the intelligent server 200.

The service server 300 according to an embodiment may provide a predetermined service (for example, food order or hotel reservation) to the user terminal 100. According to an embodiment, the service server 300 may be a server operated by a third party. The service server 300 according to an embodiment may provide information for generating a plan corresponding to the received voice input to the intelligent server 200. The provided information may be stored in the capsule database 230. Further, the service server 300 may provide result information of the plan to the intelligent server 200. The service server 300 may include a plurality of communication processors (CP), CP service 301, CP service 302, . . . . .

In the integrated intelligence system 10, the user terminal 100 may provide various intelligent services to the user in response to a user input. The user input may include, for example, an input through a physical button, a touch input, or a voice input.

According to an embodiment, the user terminal 100 may provide a voice recognition service through an intelligent app (or a voice recognition app) stored in the user terminal 100. In this case, for example, the user terminal 100 may recognize a user speech (utterance) or a voice input received through the microphone and provide a service corresponding to the recognized voice input to the user.

According to an embodiment, the user terminal 100 may perform a predetermined operation on the basis of the received voice input along or together with the intelligent server and/or the service server. For example, the user terminal 100 may execute an app corresponding to the received voice input and perform a predetermined operation through the executed app.

According to an embodiment, when the user terminal 100 provides the service together with the intelligent server 200 and/or the service server, the user terminal may detect a user speech through the microphone 120 and generate a signal (or voice data) corresponding to the detected user speech. The user terminal may transmit the voice data to the intelligent server 200 through the communication interface 110.

The intelligent server 200 according to an embodiment may generate a plan for performing a task corresponding to the voice input or the result of the operation according to the plan in response to the voice input received from the user terminal 100. The plan may include, for example, a plurality of operations for performing a task corresponding to the voice input of the user and a plurality of concepts related to the plurality of operations. The concepts may be parameters input to execution of the plurality of operations or may be defined for result values output by the execution of the plurality of operations. The plan may include the relationship between the plurality of operations and the plurality of concepts.

The user terminal 100 according to an embodiment may receive the response through the communication interface 110. The user terminal 100 may output a voice signal generated within the user terminal 100 to the outside through the speaker 130 or output an image generated within the user terminal 100 to the outside through the display 140.

Figure 2:
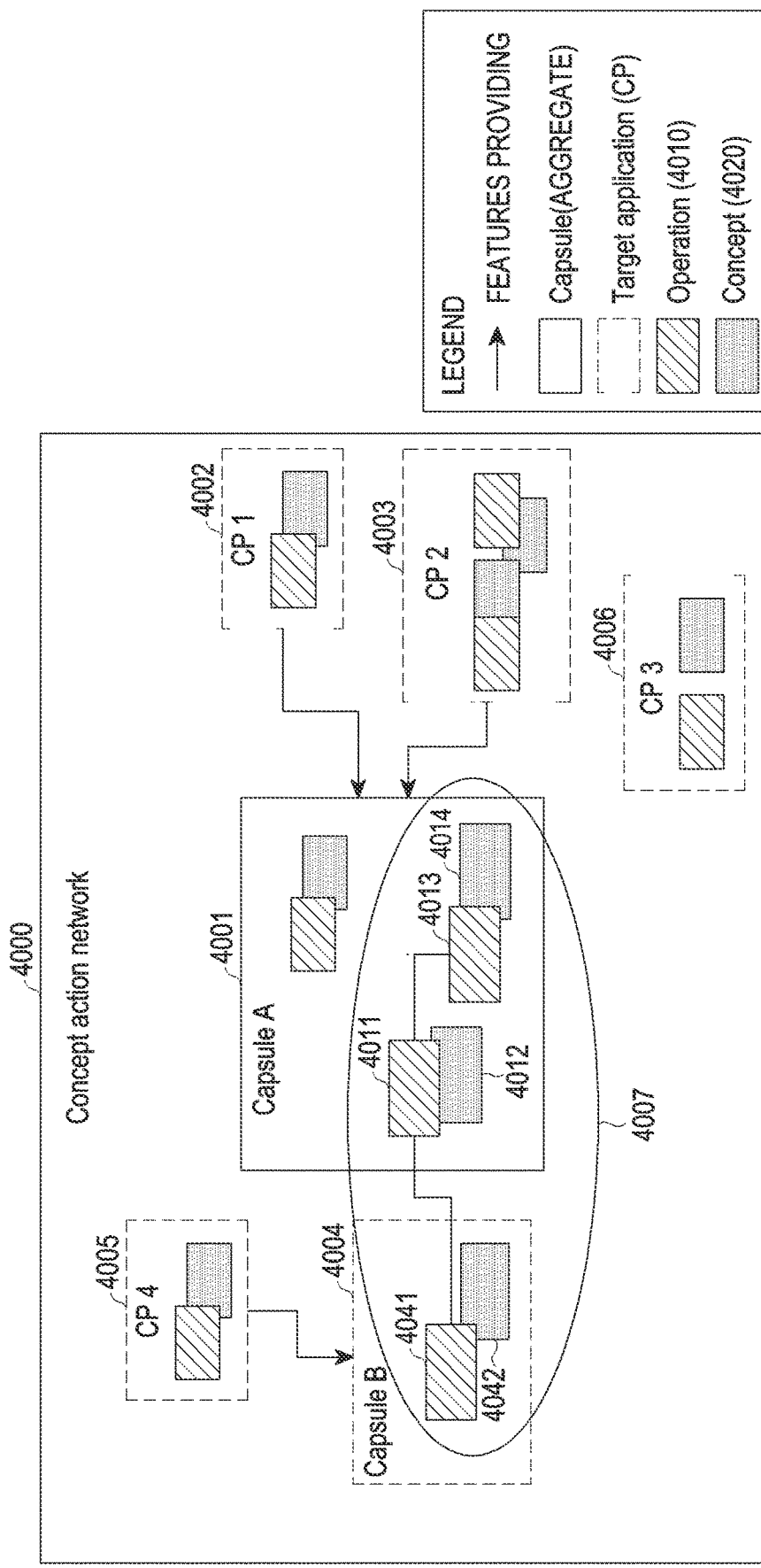
FIG. 2 is a view illustrating an example in which information for the relationship between concept and action is stored in a database according to an embodiment of the disclosure.

FIG. 2 illustrates the form of relationship information between concepts and actions stored in a database according to an embodiment of the disclosure.

Referring to FIG. 2, a capsule database (for example, the capsule database 230) of the intelligent server 200 may store capsules in the form of a Concept Action Network (CAN) 4000. The capsule database may store an operation for processing a task corresponding to a user voice input and a parameter required for the operation in the form of a Concept Action Network (CAN) 4000.

The capsule database may store a plurality of capsules (capsule A 4001 and capsule B 4004) corresponding to a plurality of domains (for example, applications). According to an embodiment, one capsule (for example, capsule A 4001) may correspond to one domain (for example, location (geo) or application). Further, one capsule may correspond to at least one service provider (for example, communication processor (CP)1 4002, CP2 4003, CP3 4006, or CP4 4005) for performing a function of the domain related to the capsule. According to an embodiment, one capsule may include one or more actions and one or more concepts for performing a predetermined function.

The natural language platform 220 may generate a plan for performing a task corresponding to the received voice input through the capsules stored in the capsule database. For example, the planner module 225 of the natural language platform may generate a plan through capsules stored in the capsule database. For example, a plan 407 may be generated using actions 4011 and 4013 and concepts 4012 and 4014 of capsule A 4001 and an action 4041 and a concept 4042 of capsule B 4004. Each of CP1 4002, CP2 4003, CP3 4006, or CP4 4005 contain an operation 4010 and a concept 4020.

Figure 3:
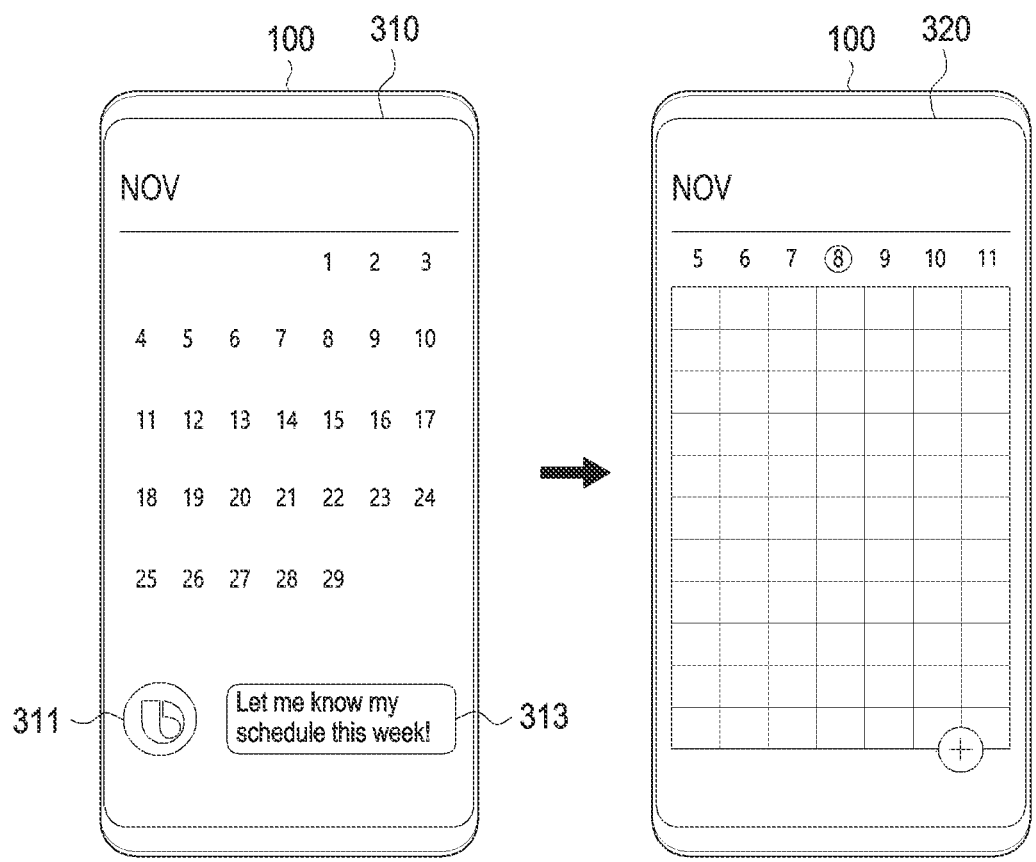
FIG. 3 is a view illustrating a user terminal displaying a screen for processing a speech input received through an intelligent app according to an embodiment of the disclosure.

FIG. 3 illustrates screens for processing a user voice received by a user terminal through an intelligent app according to an embodiment of the disclosure.

Referring to FIG. 3, the user terminal 100 may execute an intelligent app in order to process a user input through the intelligent server 200.

According to an embodiment, when the user terminal 100 recognizes a predetermined voice input (for example, wake up!) or receives an input through a hardware key (for example, a dedicated hardware key) in the screen 310, the user terminal 100 may execute an intelligent app for processing the voice input. The user terminal 100 may execute the intelligent app in the state in which, for example, a schedule app is executed. According to an embodiment, the user terminal 100 may display an object 311 (for example, an icon) corresponding to the intelligent app on the display 140. According to an embodiment, the user terminal 100 may receive the voice input by a user utterance. For example, the user terminal 100 may receive a voice input "Let me know my schedule this week". According to an embodiment, the user terminal 100 may display a User Interface (UI) 313 (for example, an input window) of the intelligent app displaying text data of the received voice input on the display.

According to an embodiment, in a screen 320, the user terminal 100 may display the result corresponding to the received voice input on the display. For example, the user terminal 100 may receive a plan corresponding to the received user input and display the "this week's schedule" on the display according to the plan.

Figure 4:
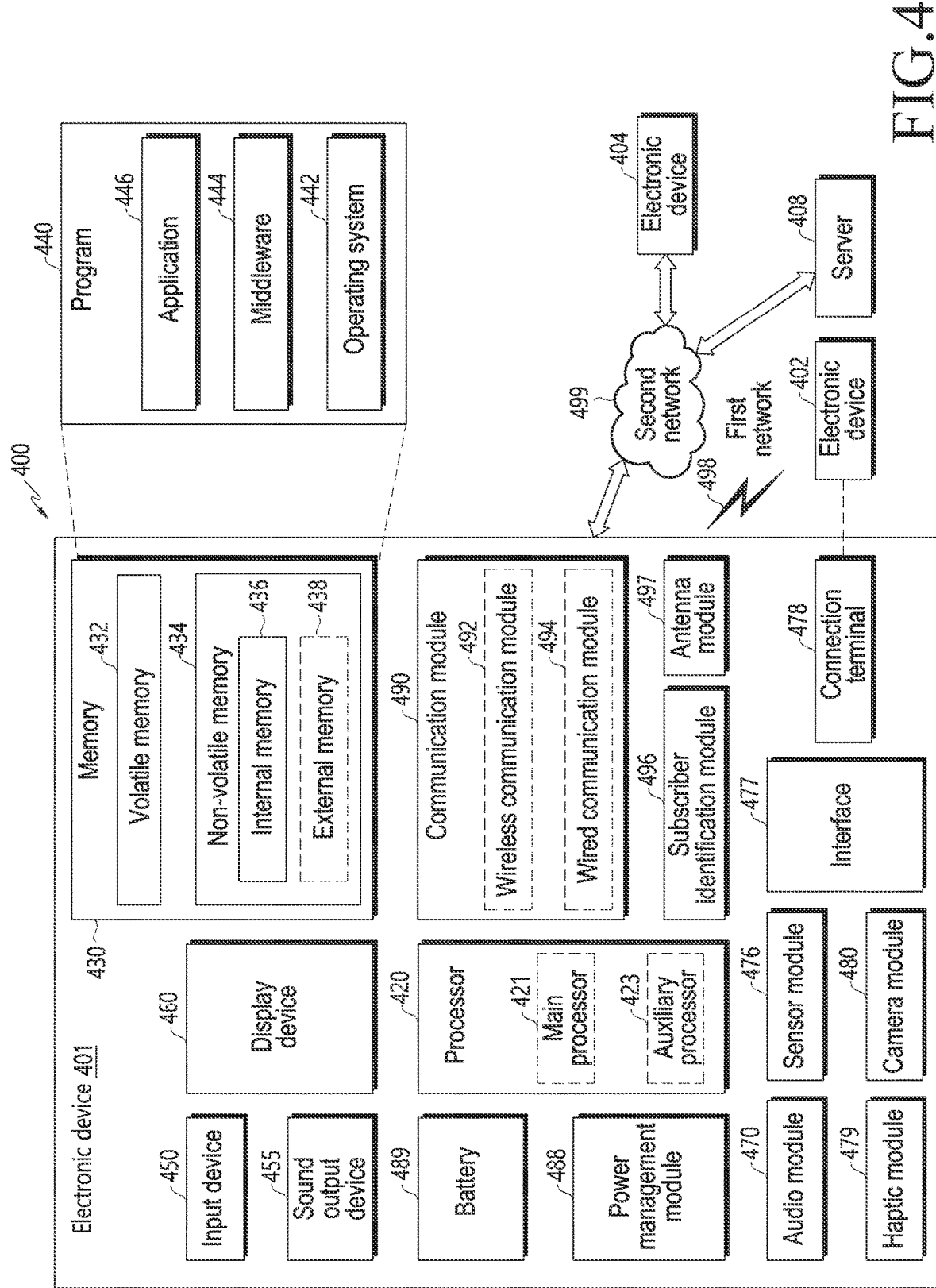
FIG. 4 is a view illustrating an electronic device in a network environment according to an embodiment of the disclosure.

FIG. 4 is a block diagram illustrating an electronic device in a network environment according to an embodiment of the disclosure.

Referring to FIG. 4, an electronic device 401 (e.g., the user terminal 100 of FIG. 1) in a network environment 400 may communicate with at least one of an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, memory 430, an input module 450, a sound output module 455, a display module 460, an audio module 470, a sensor module 476, an interface 477, a connecting terminal 478, a haptic module 479, a camera module 480, a power management module 488, a battery 489, a communication module 490, a subscriber identification module (SIM) 496, or an antenna module 497. In some embodiments, at least one (e.g., the connecting terminal 478) of the components may be omitted from the electronic device 401, or one or more other components may be added in the electronic device 101. According to an embodiment, some (e.g., the sensor module 476, the camera module 480, or the antenna module 497) of the components may be integrated into a single component (e.g., the display module 460).

The processor 420 may execute, for example, software (e.g., a program 440) to control at least one other component (e.g., a hardware or software component) of the electronic device 401 coupled with the processor 420, and may perform various data processing or computation. According to one embodiment, as at least part of the data processing or computation, the processor 420 may store a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), or an auxiliary processor 423 (e.g., a graphics processing unit (GPU), a neural processing unit (NPU), an image signal processor (ISP), a sensor hub processor, or a communication processor (CP)) that is operable independently from, or in conjunction with, the main processor 421. For example, when the electronic device 401 includes the main processor 421 and the auxiliary processor 423, the auxiliary processor 423 may be configured to use lower power than the main processor 421 or to be specified for a designated function. The auxiliary processor 423 may be implemented as separate from, or as part of the main processor 421.

The auxiliary processor 423 may control at least some of functions or states related to at least one component (e.g., the display module 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423. According to an embodiment, the auxiliary processor 423 (e.g., the neural processing unit) may include a hardware structure specified for artificial intelligence model processing. The artificial intelligence model may be generated via machine learning. Such learning may be performed, e.g., by the electronic device 401 where the artificial intelligence is performed or via a separate server (e.g., the server 408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input module 450 may receive a command or data to be used by other component (e.g., the processor 420) of the electronic device 401, from the outside (e.g., a user) of the electronic device 401. The input module 450 may include, for example, a microphone, a mouse, a keyboard, keys (e.g., buttons), or a digital pen (e.g., a stylus pen).

The sound output module 455 may output sound signals to the outside of the electronic device 401. The sound output module 455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 460 may visually provide information to the outside (e.g., a user) of the electronic device 401. The display module 460 may include, for example, a display, a hologram device, or a projector and control circuitry to control a corresponding one of the display, hologram device, and projector. According to an embodiment, the display module 460 may include a touch sensor configured to detect a touch, or a pressure sensor configured to measure the intensity of a force generated by the touch.

The audio module 470 may convert a sound into an electrical signal and vice versa. According to an embodiment, the audio module 470 may obtain the sound via the input module 450, or output the sound via the sound output module 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or motion) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to one embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device 404 via a first network 498 (e.g., a short-range communication network, such as Bluetooth™, wireless-fidelity (Wi-Fi) direct, or infrared data association (IrDA)) or a second network 499 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 492 may identify or authenticate the electronic device 401 in a communication network, such as the first network 498 or the second network 499, using subscriber information (e.g., international mobile subscriber identity (IMSI)) stored in the subscriber identification module 496.

The wireless communication module 492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 492 may support a high-frequency band (e.g., the millimeter (mm) Wave band) to achieve, e.g., a high data transmission rate. The wireless communication module 492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 492 may support various requirements specified in the electronic device 401, an external electronic device (e.g., the electronic device 404), or a network system (e.g., the second network 499). According to an embodiment, the wireless communication module 492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 497 may transmit or receive a signal or power to or from the outside (e.g., the external electronic device). According to an embodiment, the antenna module 497 may include one antenna including a radiator formed of a conductor or conductive pattern formed on a substrate (e.g., a printed circuit board (PCB)). According to an embodiment, the antenna module 497 may include a plurality of antennas (e.g., an antenna array). In this case, at least one antenna appropriate for a communication scheme used in a communication network, such as the first network 498 or the second network 499, may be selected from the plurality of antennas by, e.g., the communication module 490. The signal or the power may then be transmitted or received between the communication module 490 and the external electronic device via the selected at least one antenna. According to an embodiment, other parts (e.g., radio frequency integrated circuit (RFIC)) than the radiator may be further formed as part of the antenna module 497.

According to various embodiments, the antenna module 497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. The external electronic devices 402 or 404 each may be a device of the same or a different type from the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, mobile edge computing (MEC), or client-server computing technology may be used, for example. The electronic device 401 may provide ultra-low-latency services using, e.g., distributed computing or mobile edge computing. In another embodiment, the external electronic device 404 may include an internet-of-things (IoT) device. The server 408 may be an intelligent server using machine learning and/or a neural network. According to an embodiment, the external electronic device 404 or the server 408 may be included in the second network 499. The electronic device 401 may be applied to intelligent services (e.g., smart home, smart city, smart car, or health-care) based on 5G communication technology or IoT-related technology.

Figure 5:
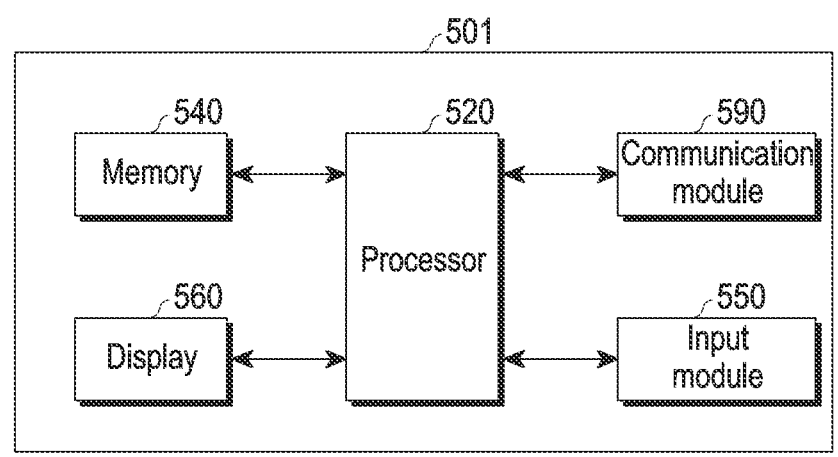
FIG. 5 is a block diagram illustrating an electronic device according to an embodiment of the disclosure.

FIG. 5 is a block diagram illustrating an electronic device according to an embodiment of the disclosure.

Referring to FIG. 5, an electronic device 501 (e.g., the user terminal 100 of FIG. 1 and/or the electronic device 401 of FIG. 4) may include a processor 520 (e.g., the processor 160 of FIG. 1 or the processor 420 of FIG. 4), a memory 540 (e.g., the memory 150 of FIG. 1 or the memory 430 of FIG. 4), an input module 550 (e.g., the microphone 120 of FIG. 1 or the input module 450 of FIG. 4), a display 560 (e.g., the display 140 of FIG. 1 or the display module 460 of FIG. 4), and/or a communication module 590 (e.g., the communication interface 110 of FIG. 1 or the communication module 490 of FIG. 4).

According to an embodiment, the processor 520 (e.g., the processor 160 of FIG. 1 and/or the processor 420 of FIG. 4) may store a dynamic shortcut command including type information for a dynamic variable word.

According to an embodiment, in a shortcut command generation mode, the processor 520 may display a shortcut command name field and a command field on the screen of the display 560.

When the user inputs a shortcut command name of a word or phrase into the shortcut command name field and at least one command of a word or phrase into the command field, the processor 520 may identify whether the input shortcut command name and the input command both include a first word for supporting a dynamic shortcut command.

Upon identifying that the input shortcut command name and the input command both include the first word for supporting the dynamic shortcut command, the processor 520 may notify the user that a dynamic shortcut command may be generated and, upon receiving the user's consent to generate a dynamic shortcut command, identify the type information for the first word based on at least one database (DB) stored in the memory 540 or the server (e.g., the intelligent server 200 of FIG. 1), detect at least one second word having the same type information as the first word, and determine that the first word and the at least one second word are dynamic variable words (for example, first dynamic variable words).

When it is selected to store the shortcut command, the processor 520 may delete the first word that is included in both the input shortcut command name and the input command and may include the type information (for example, first type information) for the dynamic variable word ((for example, a first dynamic variable word), which is the type information (for example, first type information) for the first word, instead of the first word, in the shortcut command name and the command).

The processor 520 may store the shortcut command name and the command including the type information for a dynamic variable word, as the dynamic shortcut command, and store the first word and the at least one second word, as dynamic variable words (for example, first dynamic variable words).

The processor 520 may display the at least one second word through the display 560 and, when the user selects one from among the at least one second word, determine that the first word and the determined second word are the dynamic variable words (for example, first dynamic variable words).

The processor 520 may store the shortcut command name and the command including the type information (for example, first type information) for the dynamic variable word (for example, a first dynamic variable word), as the dynamic shortcut command (for example, first dynamic shortcut command), in the first DB of the memory 540 or the server and store the first word and the at least one second word, as the dynamic variable words (for example, first dynamic variable words), in the second DB of the memory 540 or the server. The dynamic shortcut command (for example, a first dynamic shortcut command) stored in the first DB and the dynamic variable word (for example, a first dynamic variable word) stored in the second DB may have the same identity (id) and may be stored in association with each other.

For example, when a shortcut command name (e.g., "Home IU") and a plurality of commands (e.g., "Play IU songs on Samsung Music in order of popularity" and "Set the volume to 70%") input by the user in the shortcut command generation mode, both, include the first word "IU" which supports the dynamic shortcut command, the processor 520 may identify that first type information for "IU" is "{singer}" based on at least one DB stored in the memory 540 or the server (e.g., the intelligent server 200 of FIG. 1). The processor 520 may detect at least one second word, such as "BTS" and "Blackpink," which has the first type information, "singer," for "IU" as its type information, through the memory 540 or at least one DB stored in the server. The processor 520 may determine that the first word "IU" and at least one second word "BTS" and "Blackpink" are first dynamic variable words that may be used in a first dynamic shortcut command. When it is selected to store the shortcut command, the processor 520 may delete "IU" which is included in the shortcut command name and the command input by the user, add the first type information, "{singer}," for "IU," instead of "IU," and store the shortcut command name (e.g., "home {singer}") and the commands (e.g., "Play {singer} songs in order of popularity on Samsung Music" and "Set the volume to 70%") including the first type information "{singer}", as the first dynamic shortcut command, in the first DB among at least one DB stored in the memory 540 or the server, as shown in Tables 1 and 2 below and store the first word "IU" and at least one second word "BTS" and "Blackpink" as first dynamic variable words in the second DB among the at least one DB stored in the memory 540 or the server as shown in Table 3.

Table 1 below may represent a shortcut command name table of the first dynamic shortcut command stored in the first DB among the at least one DB stored in the memory 540 or the server. As shown in Table 1, the first type information ("singer') stored in the shortcut command name table may be differentiated by the identifier (e.g., "{" and "}") indicating the type information.

TABLE 1

| id | name |
|---|---|
| 0 | home {singer} |

Table 2 below may represent a command table of the first dynamic shortcut command stored in the first DB among the at least one DB stored in the memory 540 or the server.

TABLE 2

| Parent_id | id | command |
|---|---|---|
| 0 | 0_0 | "Play {singer} songs in order of popularity on Samsung Music" |
| 0 | 0_1 | "Set the volume to 70%" |

Table 3 may represent the first dynamic variable words that support the first dynamic shortcut command stored in the second DB among the at least one DB stored in the memory 540 or the server.

TABLE 3

| id | variation type | variation value |
|---|---|---|
| 0 | {singer} | IU, BTS, Blackpink . . . |

According to an embodiment, upon detecting a plurality of first words supporting the dynamic shortcut command from the shortcut command name and the command, the processor 520 may store the dynamic shortcut command including a plurality of pieces of type information in the shortcut command name and the command.

According to an embodiment, when the processor 520 identifies the first word supporting the dynamic shortcut command from the shortcut command name input by the user but does not identify the first word supporting the dynamic shortcut command from the command input by the user, the processor 520 may notify the user that it is possible to generate the dynamic shortcut command if the first word is added to the command.

According to an embodiment, when the processor 520 identifies the first word supporting the dynamic shortcut command from the command input by the user but does not identify the first word supporting the dynamic shortcut command from the shortcut command name input by the user, the processor 520 may notify the user that it is possible to generate the dynamic shortcut command if the first word is added to the shortcut command name.

According to an embodiment, the processor 520 may display a shortcut command name field, a command field, and an indicator for generating a dynamic shortcut command on the screen of the display 560 in the shortcut command generation mode.

When the indicator is moved onto the shortcut command name field by the user, the processor 520 may display at least one piece of type information that may be used as a dynamic shortcut command (for example, a first dynamic shortcut command) and at least one word included in each of the at least one piece of type information.

The processor 520 may determine that at least one word included in type information (for example, first type information) selected by the user from among the at least one piece of type information is a dynamic variable word (for example, a first dynamic variable word) and add the selected type information to the shortcut command name field and the command field.

When it is selected to store the shortcut command, the processor 520 may store the shortcut command name and command including the selected type information (for example, first type information), as the dynamic shortcut command (for example, a first dynamic shortcut command), in the first DB among at least one DB stored in the memory 540 or the server and store at least one word included in the selected type information, as a dynamic variable word, in the second DB among the at least one DB stored in the memory 540 or the server.

According to an embodiment, upon identifying a user utterance as a dynamic shortcut command, the processor 520 (e.g., the processor 160 of FIG. 1 and/or the processor 420 of FIG. 4) may change the dynamic shortcut command based on the user utterance and perform a task corresponding to the changed dynamic shortcut command.

According to an embodiment, the processor 520 may obtain the user utterance through the input module 550, change the user utterance into text information to thereby analyze the user utterance and, upon identifying that a dynamic variable word (for example, a first dynamic variable word) is included in the user utterance, determine that the user utterance is a dynamic shortcut command (for example, a first dynamic shortcut command).

The processor 520 may identify the type information (for example, type information) for the dynamic variable word (for example, a dynamic variable word) included in the user utterance and change the dynamic variable word included in the user utterance into the type information for the dynamic variable word.

The processor 520 may detect a shortcut command name identical to the user utterance including the type information (for example, first type information) for the dynamic variable word (for example, a dynamic variable word) among shortcut command names stored in the first DB among the at least one DB stored in the memory 540 or the server (e.g., the intelligent server 200 of FIG. 1).

The processor 520 may identify the dynamic variable word (for example, a first dynamic variable word) included in the user utterance and the type information (for example, first type information) for the dynamic variable word based on the second DB among the at least one DB stored in the memory 540 or the server and/or other DBs that may store dynamic variable words and the type of the dynamic variable words.

Upon detecting the shortcut command name identical to the user utterance including the type information (for example, first type information) for the dynamic variable word (for example, a first dynamic variable word) from the first DB, the processor 520 may detect a command associated with, i.e., having the same id as, the shortcut command name detected from the first DB. The processor 520 may change the type information included in the detected command into the dynamic variable word included in the user utterance and perform a task corresponding to the command in which the type information has been replaced with the dynamic variable word.

For example, upon obtaining the user utterance "home IU," the processor 520 may analyze the user utterance as shown in Table 4, based on Table 3 stored in the second DB among the at least one DB stored in the memory 540 or the server.

TABLE 4

{"variation value", "IU", "variation type": "singer?" "idx_start": 2, "idx_end" 4}

The processor 520 may change the text information "home IU," which corresponds to the user utterance, into "home {singer}" based on the result of analysis as shown in Table 4. The processor 520 may detect a shortcut command name table, as shown in Table 1, including the "home {singer}" as the shortcut command name among at least one shortcut command name table stored in the first DB among the at least one DB stored in the memory 540 or the server. The processor 520 may detect a command table, as shown in Table 2, which has the same id as the shortcut command name table, as shown in Table 1, change the command "Play {singer} songs in order of popularity on Samsung Music" including first type information (for example, "{singer}") among the commands included in the detected command table, into the command "Play IU songs in order of popularity on Samsung Music," and output IU songs in order of popularity on Samsung Music at the volume of 70%, as a task corresponding to the changed command.

According to an embodiment, the processor 520 may generate shortcut command name information included in the shortcut command name table stored in the first DB among the at least one DB stored in the memory 540 or the server, as a structure having such a data type as hash or tree and apply various search algorithms to thereby determine the shortcut command table corresponding to the user utterance.

According to an embodiment, upon obtaining a user utterance after storing all of a registered dynamic shortcut command and dynamic variable words that may be used in the registered dynamic shortcut command in a designated DB among the at least one DB stored in the memory 540 or the server, the processor 520 may determine whether the user utterance is a dynamic shortcut command by searching the designated DB. The processor 520 may generate dynamic variable words, which may be used in the registered dynamic shortcut command, in a structure having such a data type as hash and/or tree and apply various search algorithms to thereby determine whether the user utterance is a dynamic shortcut command.

According to an embodiment, the processor 520 (e.g., the processor 160 of FIG. 1 and/or the processor 420 of FIG. 4) may identify at least one dynamic variable word supported by the registered dynamic shortcut command.

According to an embodiment, the processor 520 may display the shortcut command name and at least one command of at least one dynamic shortcut command (for example, at least one first dynamic shortcut command) registered in the shortcut command identification mode and display the type information (for example, first type information) for the dynamic variable word (for example, first dynamic variable word) jointly included in the shortcut command name and the at least one command to be distinguished from the other words. When the type information for the dynamic variable word is selected from the shortcut command name or the command, the processor 520 may display at least one dynamic variable word included in the type information for the dynamic variable word. The processor 520 may edit the at least one dynamic variable word included in the type information.

According to an embodiment, the processor 520 (e.g., the processor 160 of FIG. 1 and/or the processor 420 of FIG. 4) may perform a shortcut function for a dynamic shortcut command.

According to an embodiment, the processor 520 may display an icon indicating a shortcut to a registered dynamic shortcut command (for example, a registered first dynamic shortcut command on the standby screen (e.g., home screen) and display a shortcut command name including a dynamic variable word (for example, a first dynamic variable word near the icon. The processor 520 may display the dynamic variable word in the shortcut command name to be distinguished from the other words.

When the shortcut icon is selected, the processor 520 may display at least one dynamic variable word having the same type information (for example, first type information) as the dynamic variable word (for example, a first dynamic variable word) and execute a task corresponding to the dynamic shortcut command including the dynamic variable word selected by the user's touch input or speech input from among the at least one dynamic variable word displayed.

When the shortcut icon is selected, the processor 520 may execute a task corresponding to a dynamic shortcut command (for example, a first dynamic shortcut command) including a dynamic variable word set as default among the at least one dynamic variable word having the same type information (for example, type information) as the dynamic variable word (for example, a first dynamic variable word).

According to an embodiment, the memory 540 (e.g., the memory 150 of FIG. 1 and/or the memory 430 of FIG. 4) may store a plurality of DBs among which the first DB may store at least one shortcut command name and at least one command of the dynamic shortcut command, and the second DB may store at least one dynamic variable word supporting the dynamic shortcut command and type information for the dynamic variable word. The plurality of DBs may include a third DB storing all general information, a fourth DB storing all the information mentioned by the user via a user utterance, and a fifth DB storing information substantially present in the electronic device 501.

According to an embodiment, the input module 550 (e.g., the microphone 120 of FIG. 1 and/or the input module 450 of FIG. 4) may obtain a user utterance.

According to an embodiment, the display (e.g., the display 140 of FIG. 1) may display a shortcut command name and a command input by the user in the shortcut command generation mode and display a shortcut command name and command that include type information (for example, first type information) for the dynamic variable word instead of the dynamic variable word (for example, a first dynamic variable word) jointly included in the shortcut command name and command input by the user.

According to an embodiment, the display 560 (e.g., the display 140 of FIG. 1 and/or the display module 460 of FIG. 4) may display at least one dynamic variable word included in the type information according to a selection of the type information (for example, first type information) for the dynamic variable word (for example, a first dynamic variable word) jointly included in the shortcut command name and command in the shortcut command identification mode.

According to an embodiment, the communication module 590 (e.g., the communication interface 110 of FIG. 1 and/or the communication module 490 of FIG. 4) may include a plurality of communication circuits using different communication technologies.

According to an embodiment, the communication module 590 may include a mobile communication module (not shown) or a sub communication module (not shown) performing short-range communication with a wireless LAN. The communication module 590 may perform communication with an external device using at least one antenna (not shown) under the control of the processor 520.

According to an embodiment, the communication module 590 may include at least one of a wireless LAN module (not shown) and a short-range communication module (not shown) and may include a near-field communication (NFC) communication module, Bluetooth legacy communication module, and/or a Bluetooth low energy (BLE) communication module as the short-range communication module.

Figure 6:
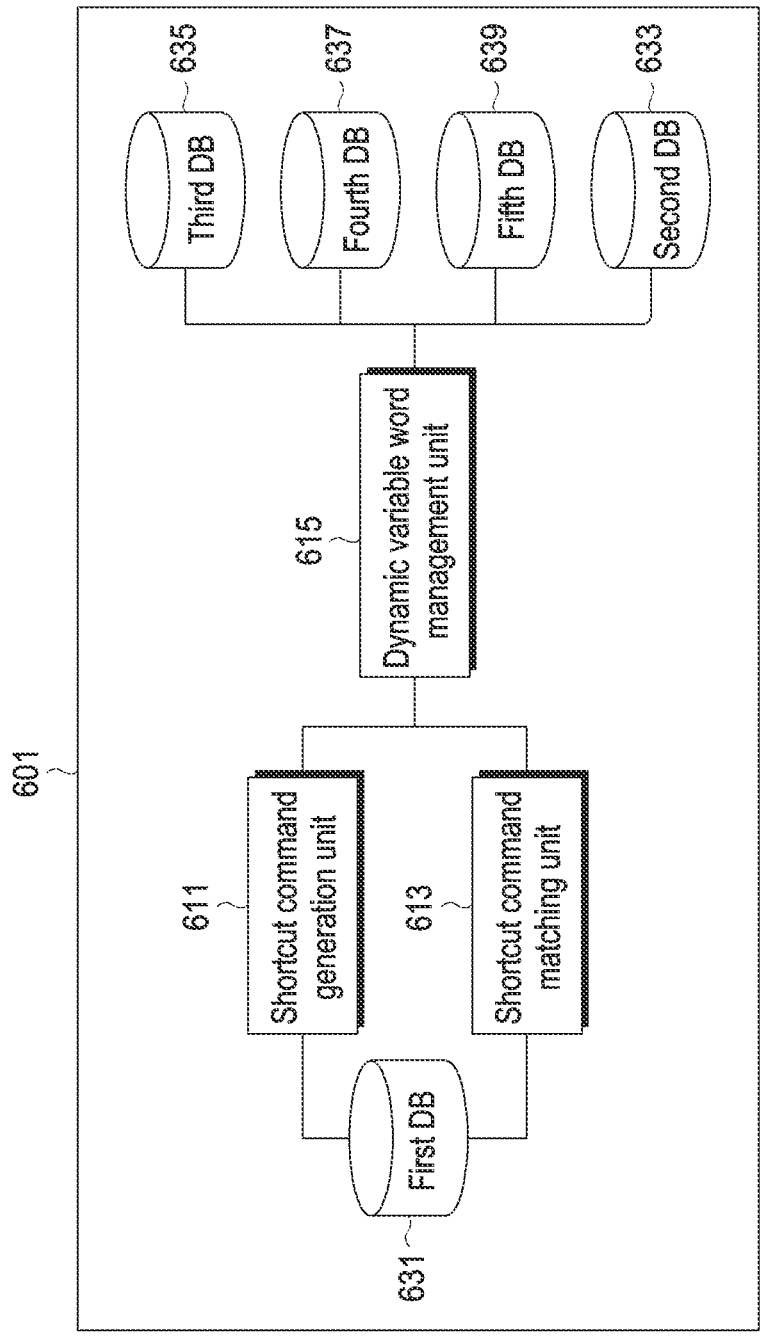
FIG. 6 is a view illustrating a configuration of a system for performing a dynamic shortcut command by an electronic device according to an embodiment of the disclosure.

FIG. 6 is a view illustrating a configuration of a system for performing a dynamic shortcut command by an electronic device according to an embodiment of the disclosure.

Referring to FIG. 6, a system 601 for performing a dynamic shortcut command may include a shortcut command generation unit 611, a shortcut command matching unit 613, a dynamic variable word management unit 615, a first DB 631, a second DB 633, a third DB 635, a fourth DB 637, and a fifth DB 639.

The shortcut command generation unit 611 is a module for managing the generation of shortcut commands. When a shortcut command name and a command input by the user include a first word supporting a dynamic shortcut command, the shortcut command generation unit 611 may receive at least one second word having the same type information as the first word from the dynamic variable word management unit 615 and provide the at least one second word to a user interface (UI). When a dynamic shortcut command is generated, the shortcut command generation unit 611 may store the shortcut command name and command of the dynamic shortcut command in the first DB 631 and store at least one dynamic variable word, which may be used in the dynamic shortcut command, in the second DB 633.

The shortcut command matching unit 613 may identify whether the user utterance matches the shortcut command Upon identifying that the user utterance is a dynamic shortcut command using the first DB 631 and the dynamic variable word management unit 615 controlling the second DB 633, third DB 635, fourth DB 637, and fifth DB 639 including the dynamic variable word and the type information for the dynamic variable word, the shortcut command matching unit 613 may detect the dynamic shortcut command (e.g., shortcut command name) corresponding to the user utterance, change the type information included in the dynamic shortcut command (e.g., command) into the dynamic variable word included in the user utterance, and perform the task corresponding to the changed dynamic shortcut command.

The dynamic variable word management unit 615 may provide and manage the dynamic variable word and provide the dynamic variable word and the type information for the dynamic variable word using the second DB 633, third DB 635, fourth DB 637, and fifth DB 639.

The dynamic variable word management unit 615 may provide the dynamic variable word corresponding to the user utterance and the type information for the dynamic variable word using the second DB 633 or may provide the dynamic variable word and the type information for the dynamic variable word using the third DB 635, fourth DB 637, and fifth DB 639 without generating the second DB 633.

The first DB 631 may store the shortcut command name and command of the dynamic shortcut command registered by the user.

The second DB 633 may store at least one dynamic variable word supporting the dynamic shortcut command registered by the user and type information for the dynamic variable word.

The third DB 635 may store all general information (e.g., songs, singers, program names, or city names) and may store information in which the dynamic variable word has been classified as general type information.

The fourth DB 637 may store all the information mentioned by the user via a user utterance and may store the dynamic variable word mentioned or used previously by the user via a user utterance and the type information for the dynamic variable word.

The fifth DB 639 may store information substantially present in the electronic device (e.g., the electronic device 501 of FIG. 5) and may store the dynamic variable word for the data corresponding to the dynamic variable word present in the electronic device and type information for the dynamic variable word.

The shortcut command generation unit 611, the shortcut command matching unit 613, and the dynamic variable word management unit 615 may be included in the processor (e.g., the processor 520 of FIG. 5) or may be operated under the control of the processor 520. The processor 520 may perform the functions of the shortcut command generation unit 611, the shortcut command matching unit 613, and the dynamic variable word management unit 615.

The first DB 631, the second DB 633, the third DB 635, the fourth DB 637, and the fifth DB 639 may be stored in the memory (e.g., the memory 540 of FIG. 5) or the server (e.g., the intelligent server 200 of FIG. 1).

Figure 7:
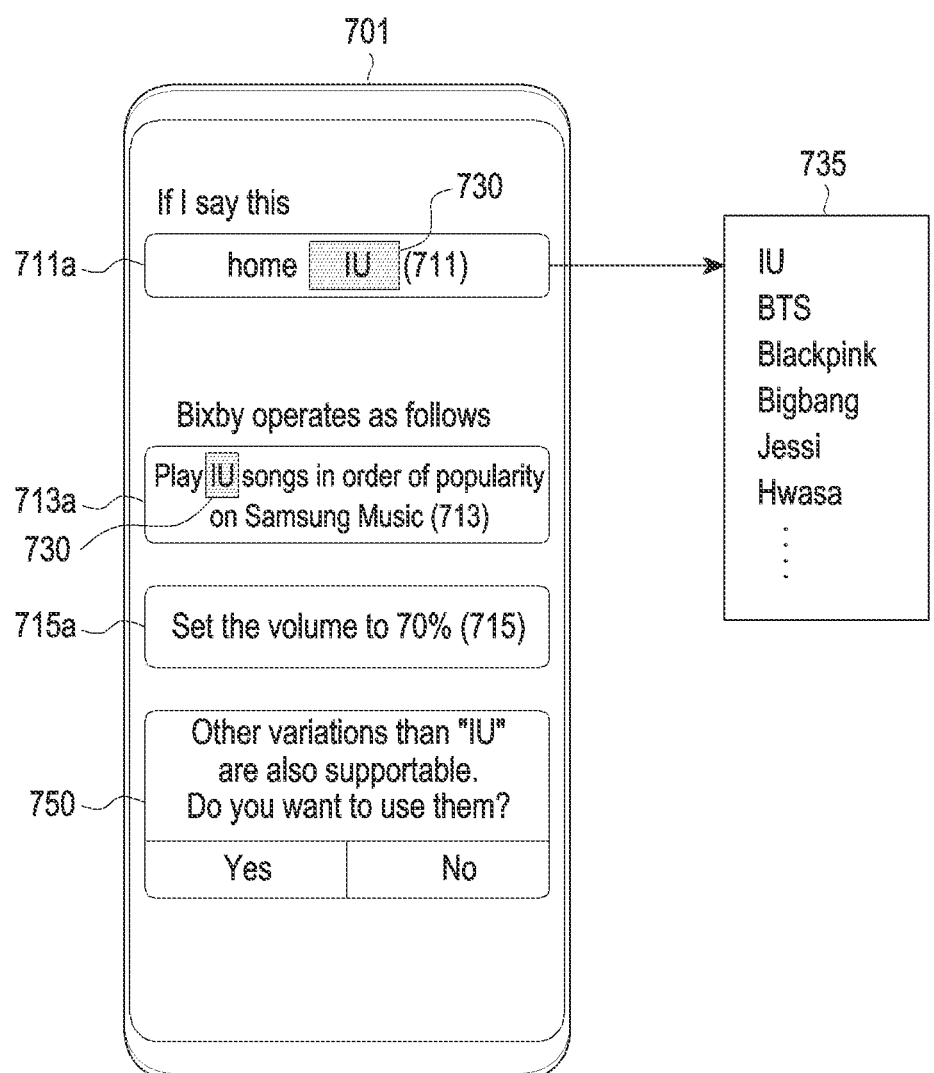
FIG. 7 is a view illustrating an operation for registering a dynamic shortcut command by an electronic device according to an embodiment of the disclosure.

FIG. 7 is a view illustrating an operation for registering a dynamic shortcut command by an electronic device according to an embodiment of the disclosure.

Referring to FIG. 7, an electronic device 701 (e.g., the user terminal 100 of FIG. 1, the electronic device 401 of FIG. 4, and/or the electronic device 501 of FIG. 5) may notify the user that a dynamic shortcut command may be generated through a popup window 750 upon identifying that a shortcut command name 711 input to a shortcut command name field 711*a* by the user in the shortcut command generation mode and commands 713 and 715 input to command fields 713*a* and 715*a* by the user jointly include a first word 730 ("IU") supporting the dynamic shortcut command.

When selection of "yes" on the popup window 750 by the user is identified, the electronic device 701 may detect at least one second word 735 having the same first type information ("{singer}") as the first word 730 ("IU") based on at least one DB (e.g., the third DB 635, fourth DB 637, and fifth DB 639 of FIG. 6) stored in a memory (e.g., the memory 540 of FIG. 5) or a server (e.g., the intelligent server 200 of FIG. 1) and automatically determine that the first word 730 ("IU") and the at least one second word 735 as first dynamic variable words supporting a dynamic shortcut command.

Figure 8:
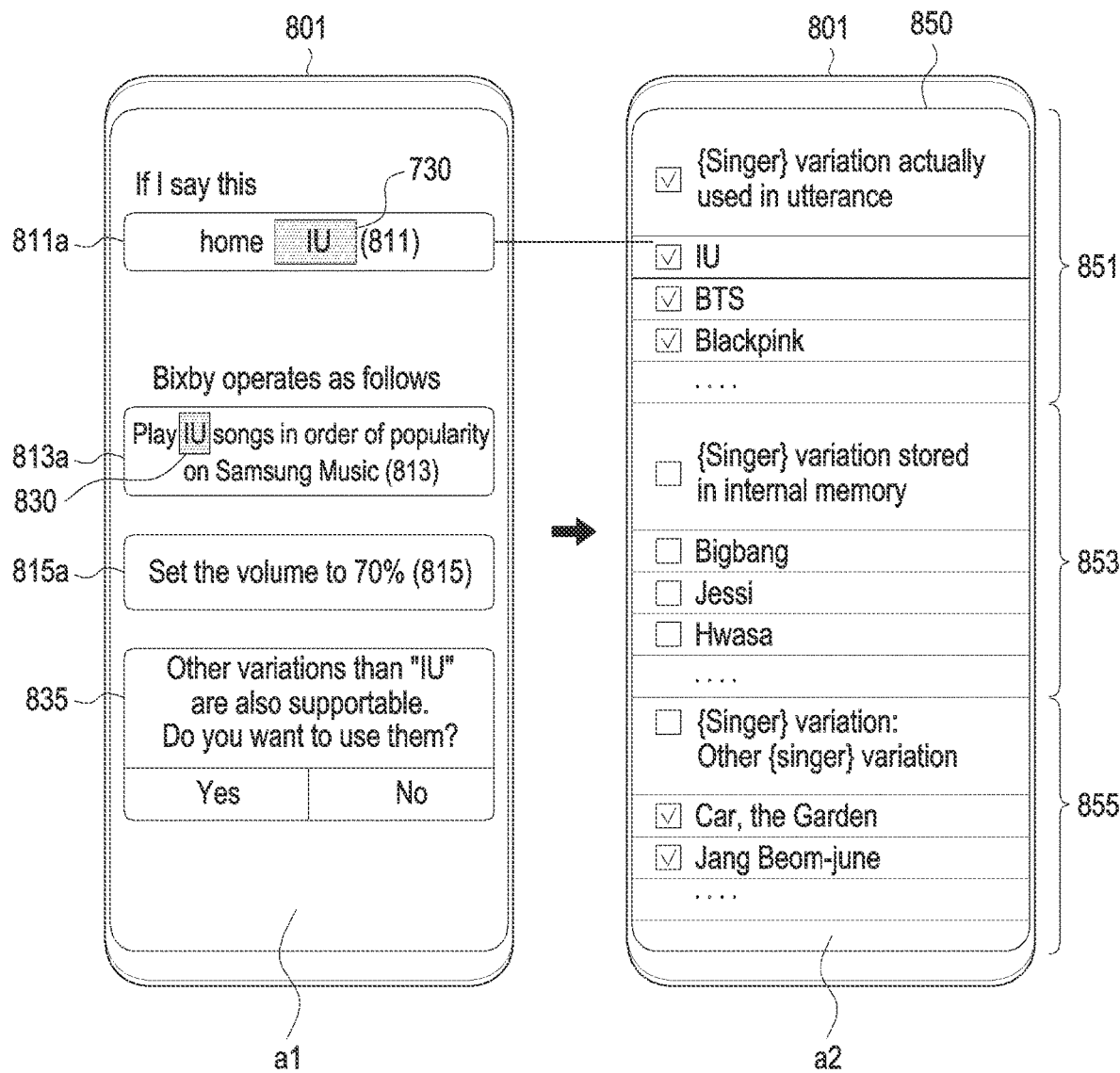
FIG. 8 is a view illustrating an operation for registering a dynamic shortcut command by an electronic device according to an embodiment of the disclosure.

FIG. 8 is a view illustrating an operation for registering a dynamic shortcut command by an electronic device according to an embodiment of the disclosure.

Referring to FIG. 8, as in a first screen a1, an electronic device 801 (e.g., the user terminal 100 of FIG. 1, the electronic device 401 of FIG. 4, and/or the electronic device 501 of FIG. 5) may notify the user that a dynamic shortcut command may be generated through a popup window 835 upon identifying that a shortcut command name 811 input to a shortcut command name field 811*a* by the user in the shortcut command generation mode and commands 813 and 815 input to command fields 813*a* and 815*a* by the user jointly include a first word 830 ("IU") supporting the dynamic shortcut command.

When selection of "yes" on the popup window (i.e., UI 850) by the user is identified, the electronic device 801 may detect at least one second word 851, 853, and 855 having the same first type information ("{singer}") as the first word 830 ("IU") based on at least one DB (e.g., the third DB 635, fourth DB 637, and fifth DB 639 of FIG. 6) stored in a memory (e.g., the memory 540 of FIG. 5) or a server (e.g., the intelligent server 200 of FIG. 1), as in a second screen a2, and provide the detected second words 851, 853, and 855 to a UI 850 selectable by the user.

The electronic device 801 may provide information mentioned or used by the user through the user utterance, i.e., the singers (i.e., at least one second word 851) mentioned or used previously by the user through the user utterance, in the fourth DB (e.g., the fourth DB 637 of FIG. 6) among the plurality of DBs stored in the memory or the server, through the UI 850.

The electronic device 801 may provide information substantially present in the electronic device, i.e., the singers (i.e., at least one second word 853) of the songs stored in the electronic device, in the fifth DB (e.g., the fifth DB 639 of FIG. 6) among the plurality of DBs stored in the memory or the server, through the UI 850.

The electronic device 801 may provide the detected singers 855 reflecting the latest information among all general information (e.g., songs, singers, program names, or city names) in the third DB (e.g., the third DB 635 of FIG. 6) among the plurality of DBs stored in the memory or the server.

The electronic device 801 may provide the singer retrieved via the user's direct input as the second word on the UI 850.

The electronic device 801 may determine the second words selected by the user from among the at least one second word 851, 853, and 855 provided through the UI 850 and determine the first word 830 ("IU") and the second words selected by the user, as first dynamic variable words supporting a first dynamic shortcut command.

FIGS. 9A, 9B, 9C, and 9D are views illustrating an operation for registering a dynamic shortcut command by an electronic device according to various embodiments of the disclosure.

Figure 9A:
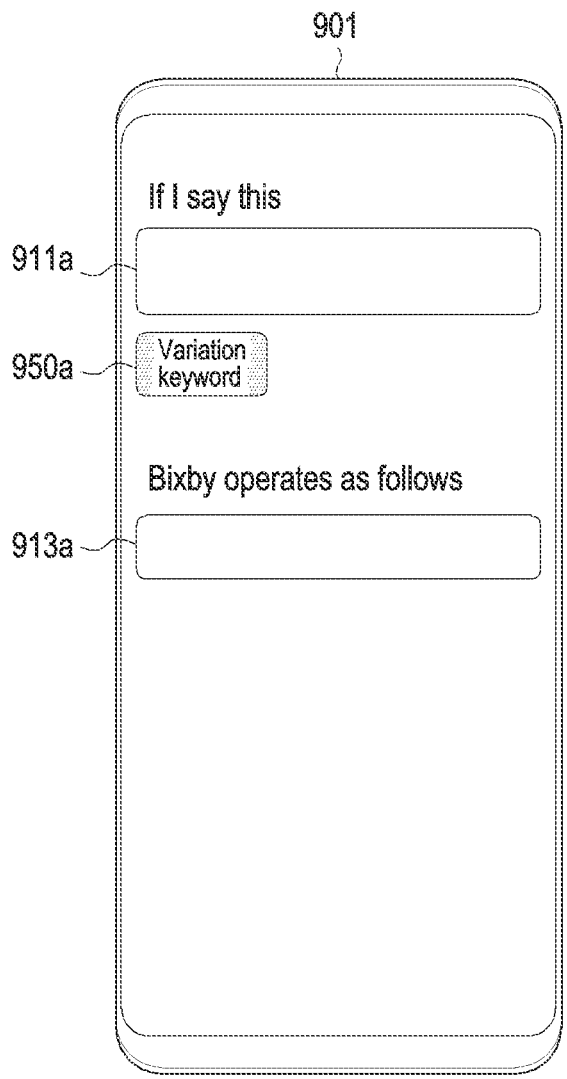
FIGS. 9A, 9B, 9C, and 9D are views illustrating an operation for registering a dynamic shortcut command by an electronic device according to various embodiments of the disclosure.

Referring to FIG. 9A, an electronic device 901 (e.g., the user terminal 100 of FIG. 1, the electronic device 401 of FIG. 4, and/or the electronic device 501 of FIG. 5) may display a shortcut command name field 911*a*, a command field 913*a*, and an indicator 950*a* for generating a dynamic shortcut command in the shortcut command generation mode.

Figure 9B:
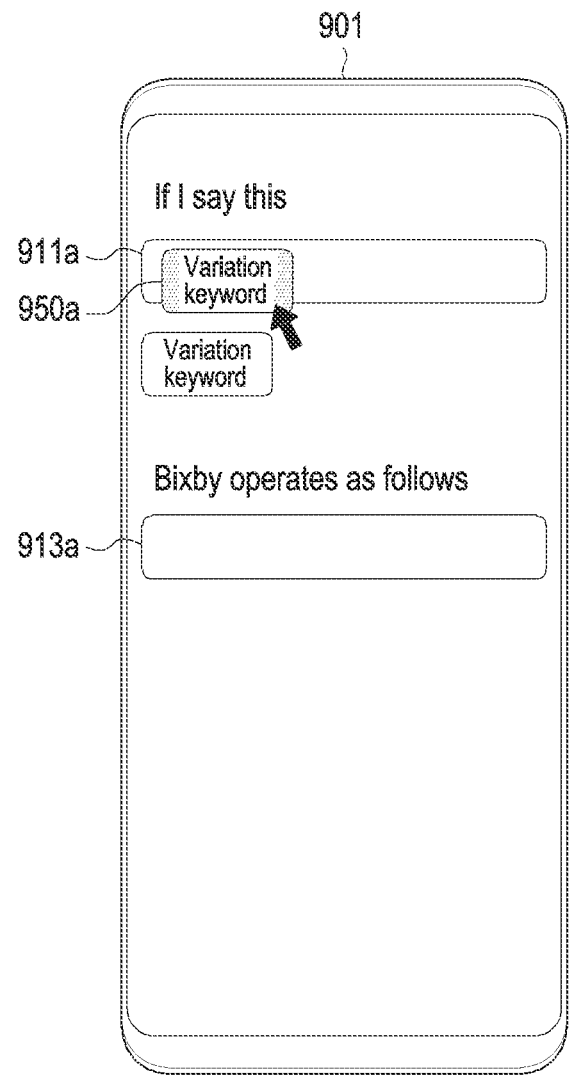
Figure 9C:
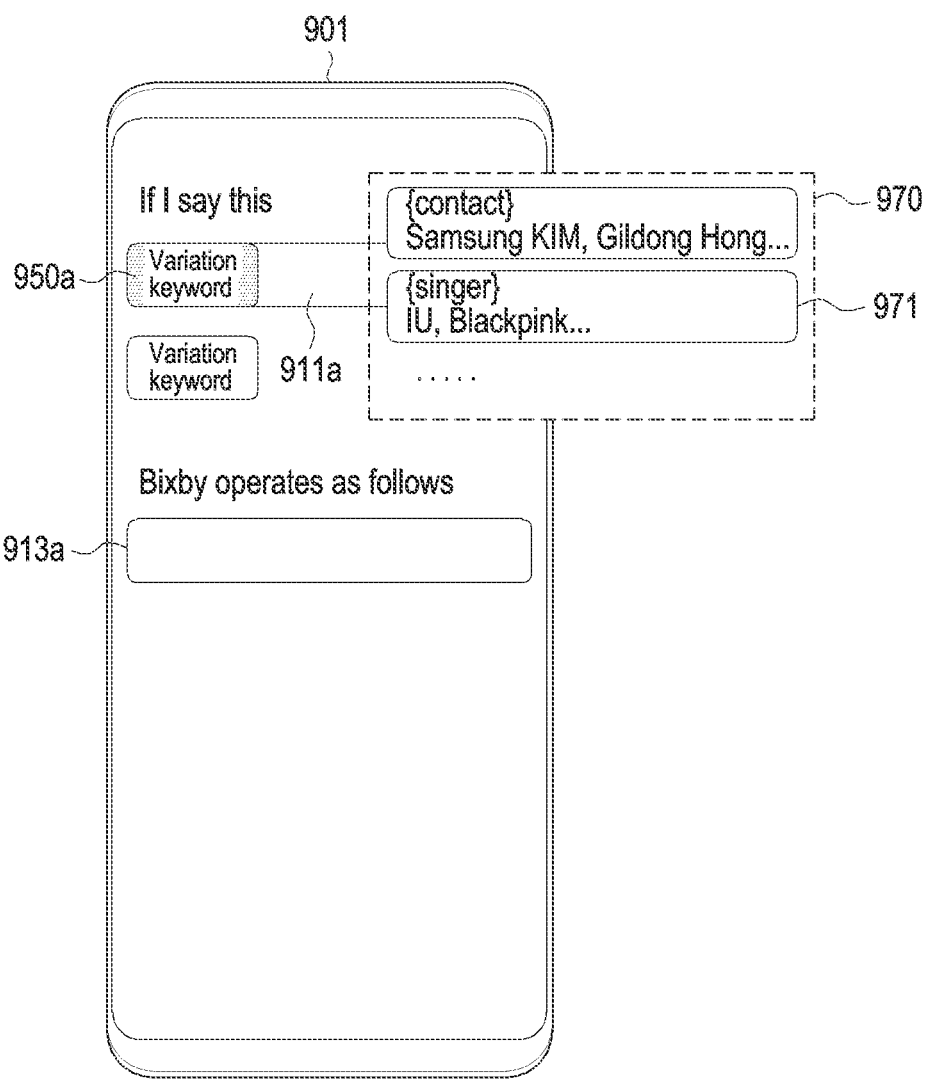

Referring to FIG. 9B, when the indicator 950*a* is positioned on the shortcut command name field 911*a* by the user's selection (e.g., drag-and-drop), referring to FIG. 9C, the electronic device 901 may provide a popup window 970 including a plurality of pieces of type information (e.g., {contact}, {singer} . . . ) and words included in each of the plurality of pieces of type information, based on at least one DB (e.g., the third DB 635, fourth DB 637, and fifth DB 639 of FIG. 6) stored in a memory (e.g., the memory 540 of FIG. 5) or a server (e.g., the intelligent server 200 of FIG. 1).

Figure 9D:
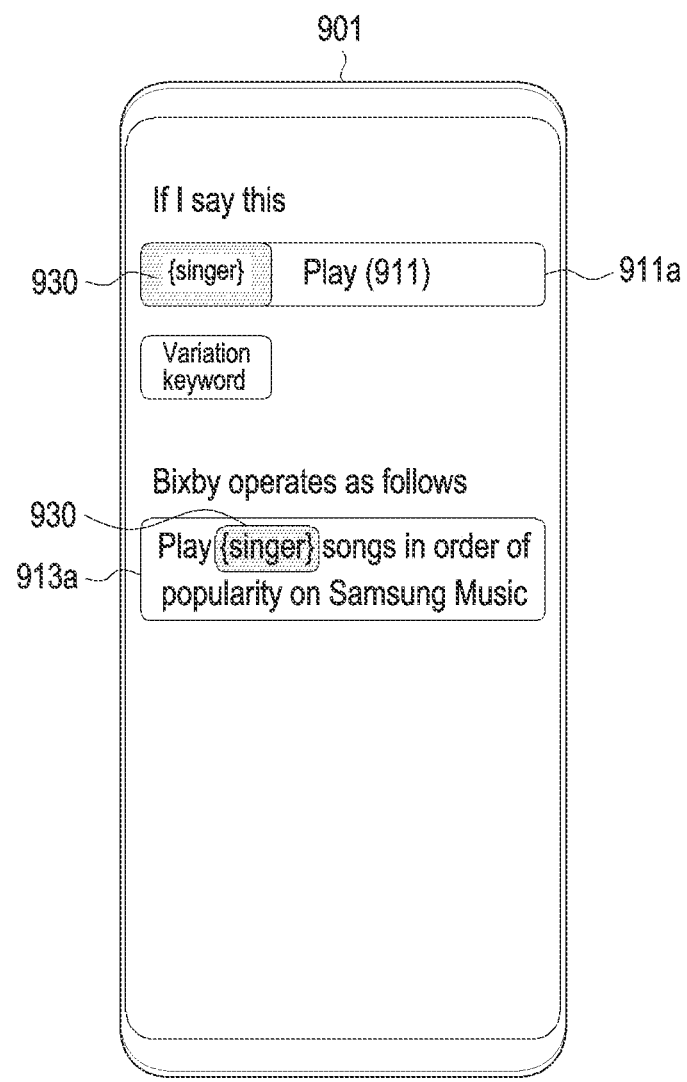

Referring to FIG. 9D, upon identifying selection of first type information 971 (e.g., {singer}) by the user on the popup window 970, the electronic device 901 may display a shortcut command name 911 and a command 913, which include the first type information "{singer}" 930 and the word or phrase input by the user, in the shortcut command name field 911a and the command field 913a, respectively.

Figure 10:
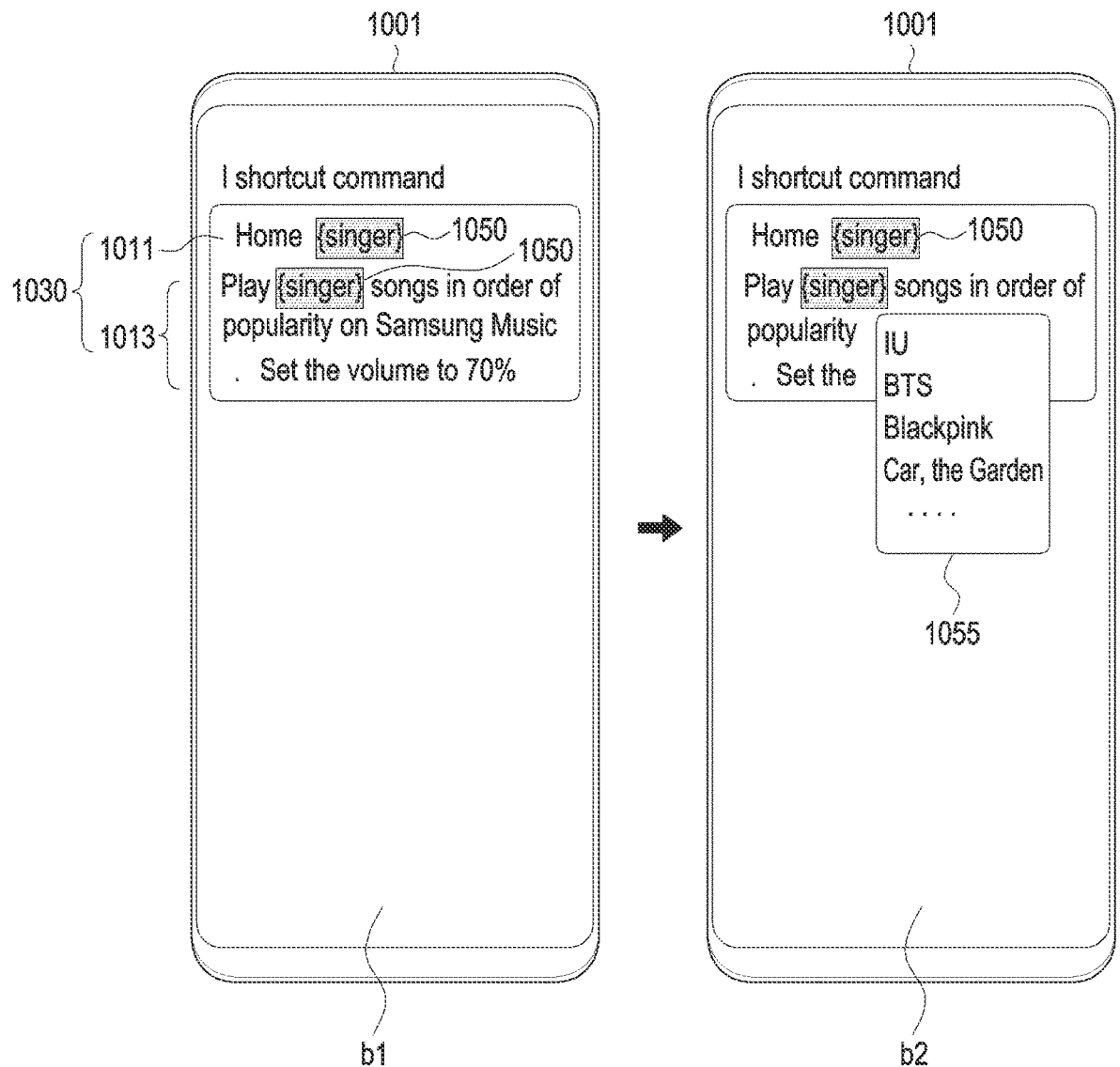
FIG. 10 is a view illustrating an operation for identifying a dynamic shortcut command by an electronic device according to an embodiment of the disclosure.

FIG. 10 is a view illustrating an operation for identifying a dynamic shortcut command by an electronic device according to an embodiment of the disclosure.

Referring to FIG. 10, an electronic device 1001 (e.g., the user terminal 100 of FIG. 1, the electronic device 401 of FIG. 4, and/or the electronic device 501 of FIG. 5) may display a registered shortcut command and/or dynamic shortcut command in the shortcut command identification mode and, as in a first screen b1, display a first dynamic shortcut command 1030 and as a shortcut command name 1011 and at least one command 1013 jointly including first type information 1050 (e.g., {singer}).

Upon identifying selection of the first type information 1050 (e.g., {singer}) in the shortcut command name 1011 or at least one command 1013 by the user, the electronic device 1001 may display first dynamic variable words 1055 included in the first type information 1050 (e.g., {singer}) as in a second screen b2. As in the second screen b2, the electronic device 1001 may provide a function for editing the first dynamic variable words 1055 included in the first type information 1050 (e.g., {singer}) to the user while displaying the first dynamic variable words 1055 included in the first type information 1050 (e.g., {singer}).

Figure 11:
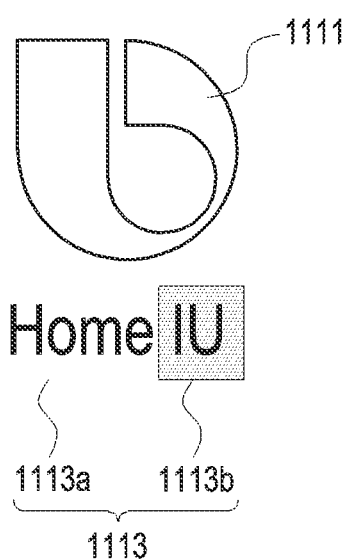
FIG. 11 is a view illustrating a shortcut function for a dynamic shortcut command on an electronic device according to an embodiment of the disclosure.

FIG. 11 is a view illustrating a shortcut function for a dynamic shortcut command on an electronic device according to an embodiment of the disclosure.

Referring to FIG. 11, an electronic device (e.g., the user terminal 100 of FIG. 1, the electronic device 401 of FIG. 4, and/or the electronic device 501 of FIG. 5) may display an icon 1111 indicating a shortcut function for a registered dynamic shortcut command on the standby screen (e.g., home screen) and display a shortcut command name 1113 including a first dynamic variable word (1113b) near the icon 1111. The electronic device may display the first dynamic variable word 1113b to be distinguished from another word 1113a in the shortcut command name 1113.

Upon identifying selection of the icon 1111 by the user, the electronic device may display at least one first dynamic variable word having the same first type information (e.g., {singer}) as the first dynamic variable word 1113b and execute a task corresponding to the first dynamic shortcut command including the first dynamic variable word selected by the user's touch input or speech input from among the at least one first dynamic variable word displayed. Upon identifying selection of the icon 1111, the electronic device may execute a task corresponding to a first dynamic shortcut command including a first dynamic variable word set as default among the at least one first dynamic variable word having the same first type information (e.g., {singer}) as the first dynamic variable word 1113b.

Figure 12A:
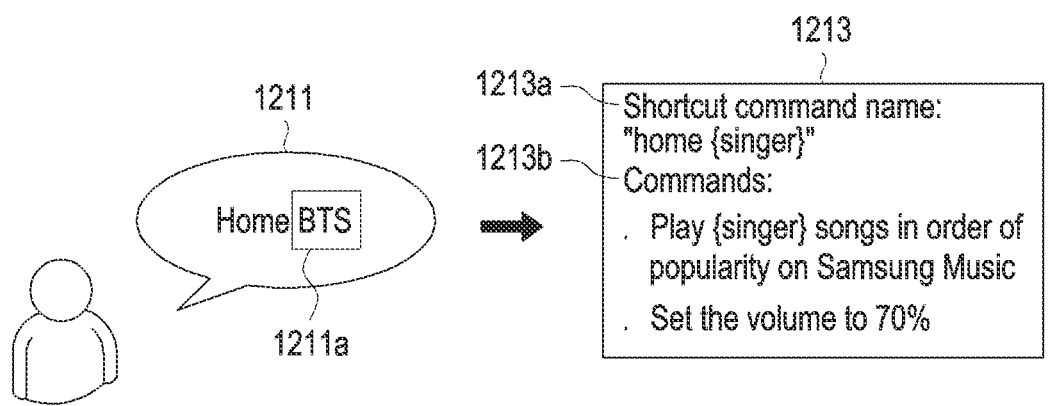
FIGS. 12A and 12B are views illustrating an operation for executing a dynamic shortcut command by an electronic device according to various embodiments of the disclosure.
Figure 12B:
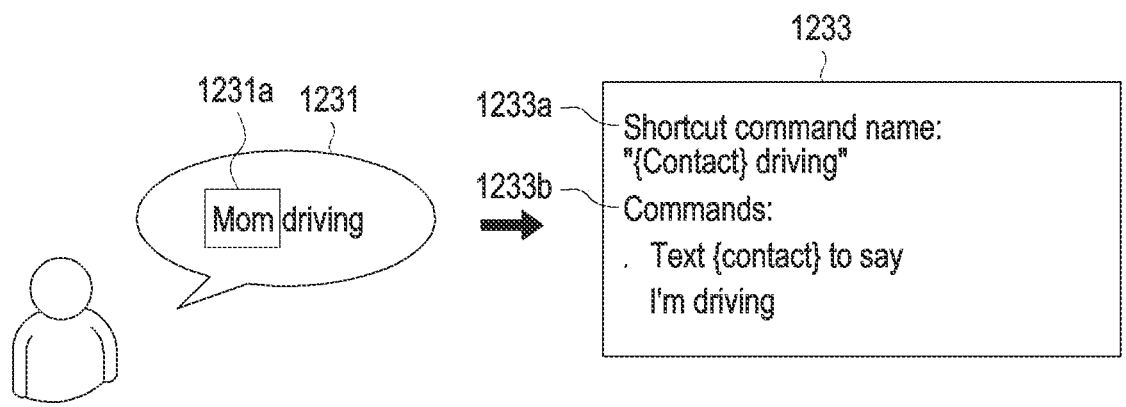

FIGS. 12A and 12B are views illustrating an operation for executing an operation shortcut command by an electronic device according to various embodiments of the disclosure.

Referring to FIG. 12A, upon obtaining a user utterance 1211, such as "home BTS," an electronic device (e.g., the user terminal 100 of FIG. 1, the electronic device 401 of FIG. 4, and/or the electronic device 501 of FIG. 5) may identify "BTS" 1211a in the user utterance 1211 as the first dynamic variable word, based on analysis of the user utterance 1211 and at least one DB (e.g., the third DB 635, fourth DB 637, and fifth DB 639 of FIG. 6) stored in a memory (e.g., the memory 540 of FIG. 5) or a server (e.g., the intelligent server 200 of FIG. 1) and determine that the user utterance 1211 is the first dynamic shortcut command.

Upon identifying that first type information for a first dynamic variable word "BTS" 1211a is "{singer}" based on the at least one DB (e.g., the third DB 635, the fourth DB 637, and the fifth DB 639 of FIG. 6) stored in the memory or the server, the electronic device may change the text information "home BTS" corresponding to the user utterance into "home {singer}" and detect a first dynamic shortcut command 1213 including the shortcut command name 1213a which is "home {singer}" and the command 1213b associated with the shortcut command name 1213a from the first DB (e.g., the first DB 631 of FIG. 6) stored in the memory or the server.

The electronic device may change the {singer} included in the command 1213b in the first dynamic shortcut command 1213 into "BTS" 1211a which is the first dynamic variable word and perform a task (e.g., play BTS songs on Samsung Music at the volume of 70%) corresponding to the changed command.

Referring to FIG. 12B, upon obtaining a user utterance 1231, such as "Mom driving," an electronic device (e.g., the user terminal 100 of FIG. 1, the electronic device 401 of FIG. 4, and/or the electronic device 501 of FIG. 5) may identify "Mom" 1231a in the user utterance 1231 as a second dynamic variable word, based on analysis of the user utterance 1231 and at least one DB (e.g., the third DB 635, fourth DB 637, and fifth DB 639 of FIG. 6) stored in a memory (e.g., the memory 540 of FIG. 5) or a server (e.g., the intelligent server 200 of FIG. 1) and determine that the user utterance 1231 is a second dynamic shortcut command.

Upon identifying that second type information for the second dynamic variable word "Mom" 1231a is "{contact}" based on the at least one DB (e.g., the third DB 635, the fourth DB 637, and the fifth DB 639 of FIG. 6) stored in the memory or the server, the electronic device may change the text information "Mom driving" corresponding to the user utterance into "{contact} driving" and detect the second dynamic shortcut command 1233 including the shortcut command name 1233a which is "{contact}" and the command 1233b associated with the shortcut command name 1233a from the first DB (e.g., the first DB 631 of FIG. 6) stored in the memory or the server.

The electronic device may change the {content} included in the command 1233b in the second dynamic shortcut command 1233 into "Mom" 1231a which is the dynamic variable word and perform a task (e.g., Text Mom to say I'm driving) corresponding to the changed command.

Figure 13A:
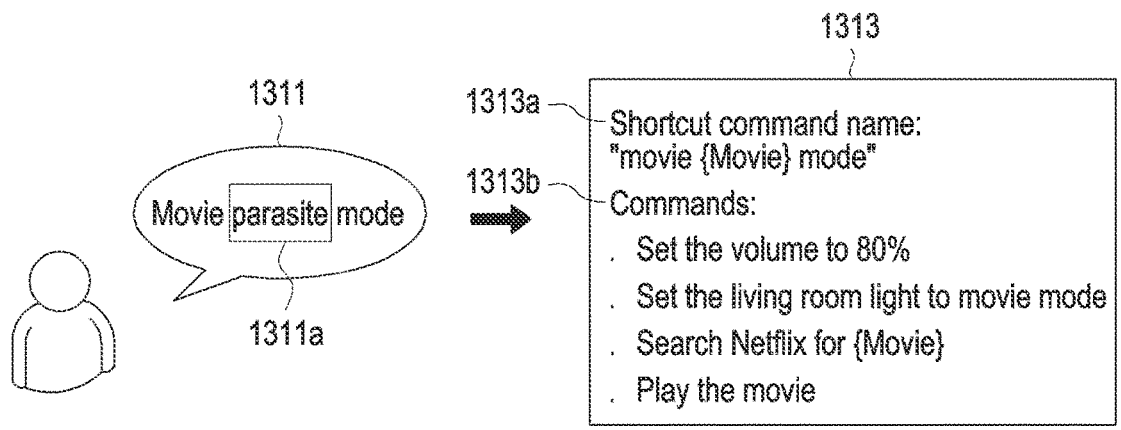
FIGS. 13A and 13B are views illustrating an operation for executing a dynamic shortcut command by an electronic device according to various embodiments of the disclosure.
Figure 13B:
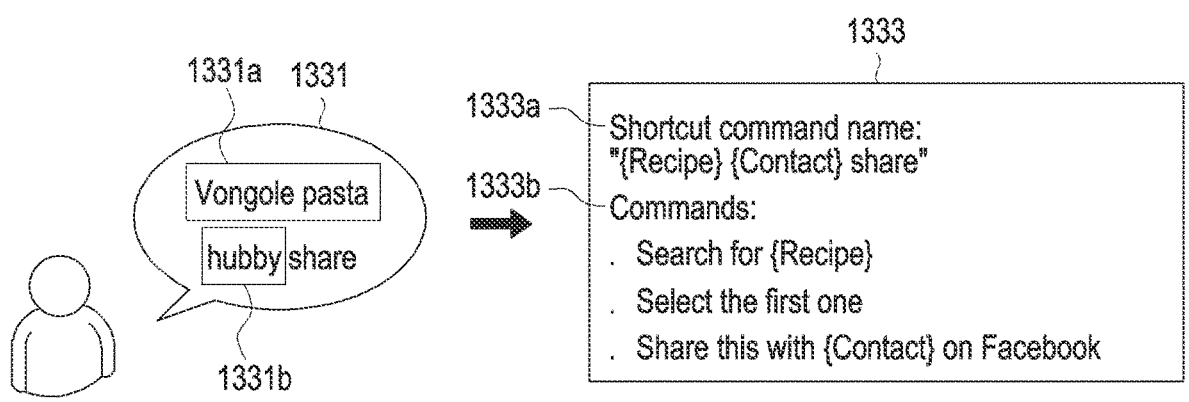

FIGS. 13A and 13B are views illustrating an operation for executing an operation shortcut command by an electronic device according to various embodiments of the disclosure.

Referring to FIG. 13A, upon obtaining a user utterance 1311, such as "movie parasite mode," an electronic device (e.g., the user terminal 100 of FIG. 1, the electronic device 401 of FIG. 4, and/or the electronic device 501 of FIG. 5) may identify "parasite" 1311a in the user utterance 1311 as a third dynamic variable word, based on analysis of the user utterance 1311 and at least one DB (e.g., the third DB 635, fourth DB 637, and fifth DB 639 of FIG. 6) stored in a memory (e.g., the memory 540 of FIG. 5) or a server (e.g., the intelligent server 200 of FIG. 1) and determine that the user utterance 1311 is a third dynamic shortcut command.

Upon identifying that third type information for the third dynamic variable word "parasite" 1311*a* is "{movie}" based on the at least one DB (e.g., the third DB 635, the fourth DB 637, and the fifth DB 639 of FIG. 6) stored in the memory or the server, the electronic device may change the text information "movie parasite mode" corresponding to the user utterance into "move {movie} mode" and detect the third dynamic shortcut command 1313 including the shortcut command name 1313*a* which is "movie {movie} mode" and the command 1313*b* associated with the shortcut command name 1313*a* from the first DB (e.g., the first DB 631 of FIG. 6) stored in the memory or the server.

The electronic device may change the {movie} included in the command 1313*b* in the third dynamic shortcut command 1313 into the third dynamic variable word "parasite" 1311*a* and perform a task (e.g., set the living room light to movie mode and play the movie Parasite discovered from Netflix at the volume of 80%) corresponding to the changed command.

Referring to FIG. 13B, upon obtaining a user utterance 1331, such as "vongole pasta hubby share," an electronic device (e.g., the user terminal 100 of FIG. 1, the electronic device 401 of FIG. 4, and/or the electronic device 501 of FIG. 5) may identify "vongole pasta" 1331*a* and "hubby" 1331*b* in the user utterance 1331 as a plurality of dynamic variable words (for example, a fourth dynamic variable word and a fifth dynamic variable word), based on analysis of the user utterance 1331 and at least one DB (e.g., the third DB 635, fourth DB 637, and fifth DB 639 of FIG. 6) stored in a memory (e.g., the memory 540 of FIG. 5) or a server (e.g., the intelligent server 200 of FIG. 1) and determine that the user utterance 1331 is the forth dynamic shortcut command.

Upon identifying that fourth type information for the fourth dynamic variable word "vongole pasta" 1331*a* is "{recipe}" and fifth type information for the fifth dynamic variable word "hubby" 1331*b* is "{contact}" based on the at least one DB (e.g., the third DB 635, the fourth DB 637, and the fifth DB 639 of FIG. 6) stored in the memory or the server, the electronic device may change the text information "vongole pasta hubby share" corresponding to the user utterance into "{recipe} {contact} share" and detect the fourth dynamic shortcut command 1333 including the shortcut command name 1333*a* which is "{recipe} {contact} share" and the command 1333*b* associated with the shortcut command name 1333*a* from the first DB (e.g., the first DB 631 of FIG. 6) stored in the memory or the server.

The electronic device may change "{recipe}" and "{contact}" included in the fourth dynamic shortcut command 1333 and the command 1333*b* into "vongole pasta" 1331*a* and "hubby" 1331*b*, respectively, and perform a task (e.g., search for a vongole pasta recipe and share the first one of retrieved vongole pasta recipes with hubby on Facebook) corresponding to the changed command.

According to an embodiment, an electronic device (e.g., the electronic device 501 of FIG. 5) comprises a memory (e.g., the memory 540 of FIG. 5) for store at least one dynamic shortcut command, a display (e.g., the display 560 of FIG. 5), and a processor (e.g., the processor 160 of FIG. 1, the processor 420 of FIG. 4, or the processor 520 of FIG. 5) operatively connected with the memory and the display and configured to store a first dynamic shortcut command including first type information for at least one first dynamic variable word in the memory, when acquiring user utterance, detect the first dynamic shortcut command in the memory based on the first dynamic variable word included the user utterance, change the first type information included in the detected first dynamic shortcut command into the first dynamic variable word included in the user utterance, and execute a task corresponding to the changed first dynamic shortcut command including the first dynamic variable word included in the user utterance.

According to an embodiment, the processor may be configured to identify input of a shortcut command name and a command in a shortcut command generation mode, notify a user that the dynamic shortcut command can be generated upon identifying the first word supporting the dynamic shortcut command in the shortcut command name and the command, upon receiving consent to generate the dynamic shortcut command from the user, detect at least one second word having the same first type information as the first word and determine that the first word and the at least one second word are the first dynamic variable words that can be used in a dynamic shortcut command, and when it is selected to store a shortcut command, store the shortcut command name and the command including the first type information for the first dynamic variable word, instead of the first word, as the first dynamic shortcut command and store the first word and the at least one second word as the first dynamic variable words.

According to an embodiment, the processor may be configured to display the at least one second word through the display, and when a second word is selected by the user from among the at least one second word, determine that the first word and the selected second word are the first dynamic variable words.

According to an embodiment, the processor may be configured to store the shortcut command name and the command including the first type information for the first dynamic variable word, as the first dynamic shortcut command, in a first database (DB) (e.g., the first DB 631 of FIG. 6) of the memory and store the first word and the at least one second word, as the first dynamic variable words, in a second DB (e.g., the second DB 633 of FIG. 6) of the memory.

According to an embodiment, the processor may be configured to, upon identifying the first word supporting a dynamic shortcut command in the shortcut command name of the shortcut command name and the command, notify the user that the dynamic shortcut command may be generated when the first word is added to the command.

According to an embodiment, the processor may be configured to, upon identifying the first word supporting a dynamic shortcut command in the command of the shortcut command name and the command, notify the user that the dynamic shortcut command may be generated when the first word is added to the shortcut command name.

According to an embodiment, the processor may be configured to display an indicator for generating the dynamic shortcut command in a shortcut command generation mode, display at least one piece of type information that may be used as the dynamic shortcut command and at least one word included in each of the at least one piece of type information when the indicator is moved to a field of the shortcut command name, include the first type information selected from among the at least one piece of type information in the shortcut command name and the command and display the shortcut command name and the command, and when it is selected to store a shortcut command, store the shortcut command name and the command including the selected first type information, as the first dynamic shortcut command, and store at least one word included in the selected first type information as the first dynamic variable word.

According to an embodiment, the processor may be configured to display a shortcut command name and a command of a dynamic shortcut command registered in a shortcut command identification mode, and when the first type information for the first dynamic variable word is selected from the shortcut command name or the command, display at least one first dynamic variable word included in the first type information.

According to an embodiment, the processor may be configured to, when the user utterance is determined to be the first dynamic shortcut command, change the first dynamic variable word included in the user utterance into the first type information for the first dynamic variable word, and detect a shortcut command name including the first type information for the first dynamic variable word among at least one shortcut command name stored in a first DB of the memory.

According to an embodiment, the processor may be configured to detect a command associated with the detected shortcut command name, and change the first type information for the first dynamic variable word included in the detected command into the first dynamic variable word included in the user utterance and execute a task corresponding to the changed command including the first dynamic variable word.

Figure 14:
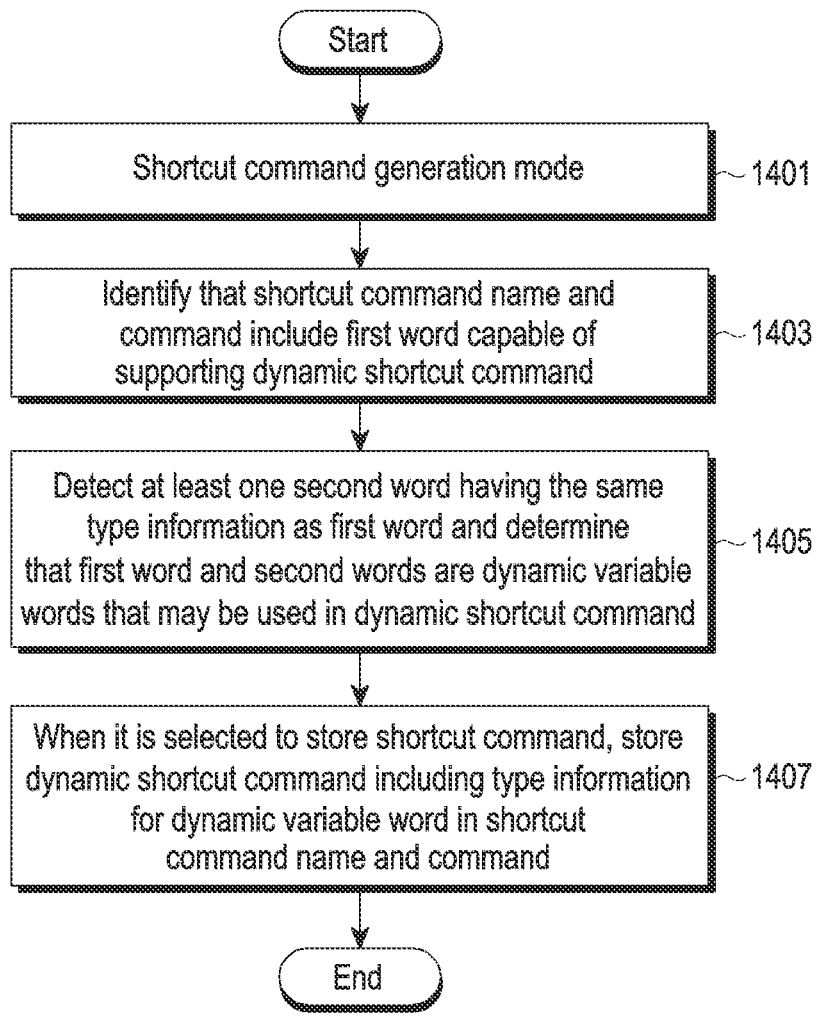
FIG. 14 is a flowchart illustrating an operation for registering a dynamic shortcut command by an electronic device according to an embodiment of the disclosure.

FIG. 14 is a flowchart illustrating an operation for registering a dynamic shortcut command by an electronic device according to an embodiment of the disclosure. The operations of registering a dynamic shortcut command may include operations 1401 to 1407. According to an embodiment, at least one of operations 1401 to 1407 may be omitted or changed in order or may add other operations. The operations of registering a dynamic shortcut command may be performed by the user terminal 100 of FIG. 1, the processor 160 of FIG. 1, the electronic device 501 of FIG. 5, or the processor 520 of FIG. 5.

Referring to FIG. 14, in operation 1401, the electronic device 501 may switch into the shortcut command generation mode.

According to an embodiment, the electronic device 501 may display a shortcut command name field and a command field on the screen of the display (e.g., the display 560 of FIG. 5) in the shortcut command generation mode.

In operation 1403, the electronic device 501 may identify that a first word capable of supporting the dynamic shortcut command is included in the shortcut command name and the command.

According to an embodiment, when the user inputs a shortcut command of a word or phrase into the shortcut command name field and at least one command of a word or phrase into the command field, the electronic device 501 may identify that the input shortcut command name and the input command both include the first word for supporting the dynamic shortcut command.

According to an embodiment, the electronic device 501 may detect the first word supporting the dynamic shortcut command from the input shortcut command name and the input command based on at least one DB (e.g., the third DB 635, the fourth DB 637, and the fifth DB 639 of FIG. 6) stored in the memory (e.g., the memory 540 of FIG. 5) or the server (e.g., the intelligent server 200 of FIG. 1).

In operation 1405, the electronic device 501 may detect at least one second word having the same type information as the first word and determine that the first word the second words are dynamic variable words that may be used in the dynamic shortcut command.

According to an embodiment, upon identifying that the shortcut command name and command input by the user both include the first word supporting the dynamic shortcut command, the electronic device 501 may notify the user that the dynamic shortcut command may be generated and, upon receiving consent to generate the dynamic shortcut command from the user, identify the type information for the first word and detect the second word having the same type information as the first word.

According to an embodiment, the electronic device 501 may identify the type information for the first word based on at least one DB (e.g., the third DB 635, the fourth DB 637, and the fifth DB 639 of FIG. 6) stored in the memory or the server and detect the second word having the same type information as the first word.

According to an embodiment, the electronic device 501 may determine that the first word and the second word are dynamic variable words.

In operation 1407, when it is selected to store the shortcut command, the electronic device 501 may store the dynamic shortcut command including the type information for the dynamic variable word in the shortcut command name and the command.

According to an embodiment, when it is selected to store the shortcut command, the electronic device 501 may delete the first word which is included in both the shortcut command name and the command input by the user, include the type information for the dynamic variable word, which is the type information for the first word, instead of the first word, in the shortcut command name and the command and store them as the dynamic shortcut command, and store the first word and the second word as dynamic variable words.

According to an embodiment of the disclosure, the electronic device 501 may store the shortcut command name and the command including the type information for the dynamic variable word, as the dynamic shortcut command, in the first DB (e.g., the first DB 631 of FIG. 6) of the memory or the server and store the first word and the second word, as the dynamic variable words, in the second DB (e.g., the second DB 633 of FIG. 6) of the memory or the server. The dynamic shortcut command stored in the first DB and the dynamic variable word stored in the second DB may have the same identity (id) and may be stored in association with each other.

Figure 15:
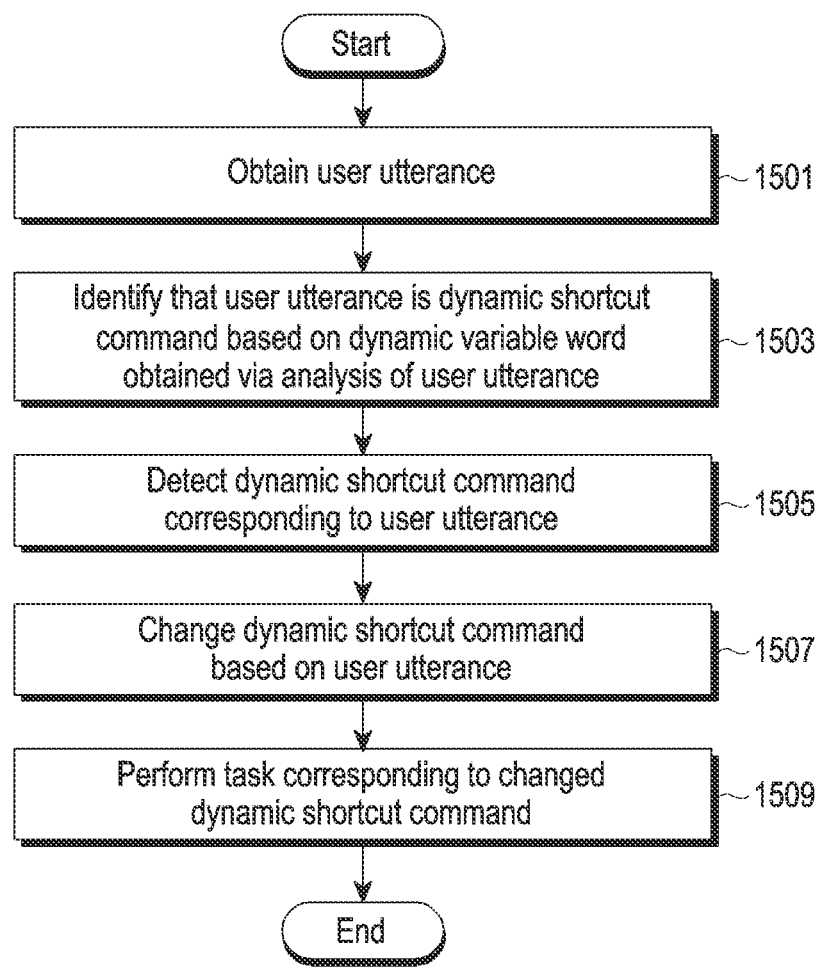
FIG. 15 is a flowchart illustrating an operation for executing a dynamic shortcut command by an electronic device according to an embodiment of the disclosure.

FIG. 15 is a flowchart illustrating an operation for executing a dynamic shortcut command by an electronic device according to an embodiment of the disclosure. The operations of executing a dynamic shortcut command may include operations 1501 to 1509. According to an embodiment, at least one of operations 1501 to 1509 may be omitted or changed in order or may add other operations. The operations of executing a dynamic shortcut command may be performed by the user terminal 100 of FIG. 1, the processor 160 of FIG. 1, the electronic device 501 of FIG. 5, or the processor 520 of FIG. 5.

Referring to FIG. 15, in operation 1501, the electronic device 501 may obtain a user utterance.

According to an embodiment, the electronic device 501 may obtain a user utterance through the input module (e.g., the input module 550 (e.g., a microphone) of FIG. 5).

In operation 1503, the electronic device 501 may identify that the user utterance is a dynamic shortcut command based on the dynamic variable word obtained via analysis of the user utterance.

According to an embodiment, the electronic device 501 may change the user utterance into text information to thereby analyze the user utterance and, upon identifying that a dynamic variable word is included in the user utterance, determine that the user utterance is a dynamic shortcut command.

According to an embodiment, the electronic device 501 may identify that the dynamic variable word is included in the user utterance based on at least one DB (e.g., the third DB 635, the fourth DB 637, and the fifth DB 639 of FIG. 6) stored in the memory (e.g., the memory 540 of FIG. 5) or the server (e.g., the intelligent server 200 of FIG. 1).

In operation 1505, the electronic device 501 may detect the dynamic shortcut command corresponding to the user utterance.

According to an embodiment, the electronic device 501 may identify type information for the dynamic variable word included in the user utterance based on at least one DB (e.g., the third DB 635, the fourth DB 637, and the fifth DB 639 of FIG. 6) stored in the memory or the server. The electronic device 501 may change the dynamic variable word included in the user utterance into type information for the dynamic variable word.

According to an embodiment, the electronic device 501 may detect the same shortcut command name as the user utterance including the type information for the dynamic variable word among shortcut command names stored in the first DB (e.g., the first DB 631 of FIG. 6) of the memory or the server.

According to an embodiment, upon detecting the shortcut command name corresponding to the user utterance including the type information for the dynamic variable word from the first DB of the memory or the server, the electronic device 501 may detect the command associated with, i.e., having the same id as, the shortcut command name detected from the first DB.

In operation 1507, the electronic device 501 may change the dynamic shortcut command based on the user utterance.

According to an embodiment, the electronic device 501 may change the type information included in the detected command into the dynamic variable word included in the user utterance, thereby changing the dynamic shortcut command.

In operation 1509, the electronic device 501 may perform a task corresponding to the changed dynamic shortcut command.

According to an embodiment, a method for performing a shortcut command by an electronic device comprises storing a first dynamic shortcut command including first type information for at least one first dynamic variable word in the memory, when acquiring use utterance, detecting the first dynamic shortcut command in memory based on the first dynamic variable word included the user utterance, changing first type information included in the detected first dynamic shortcut command into the first dynamic variable word included in the user utterance, and executing a task corresponding to the changed first dynamic shortcut command including the first dynamic variable word included in the user utterance.

According to an embodiment, generating the dynamic shortcut command may include identifying input of a shortcut command name and a command in a shortcut command generation mode, notifying a user that the dynamic shortcut command may be generated upon identifying the first word supporting the dynamic shortcut command in the shortcut command name and the command, upon receiving consent to generate the dynamic shortcut command from the user, detecting at least one second word having the same first type information as the first word, determining that the first word and the at least one second word are the first dynamic variable words that may be used in a dynamic shortcut command, and when it is selected to store a shortcut command, storing the shortcut command name and the command including the first type information for the first dynamic variable word, instead of the first word, as the first dynamic shortcut command and storing the first word and the at least one second word as the first dynamic variable words.

According to an embodiment, the method may further comprise displaying the at least one second word through a display, and when a second word is selected by the user from among the at least one second word, determining that the first word and the selected second word are the first dynamic variable words.

According to an embodiment, the method may further comprise storing the shortcut command name and the command including the first type information for the first dynamic variable word, as the first dynamic shortcut command, in a first database (DB) of a memory and storing the first word and the at least one second word, as first dynamic variable words, in a second DB of the memory.

According to an embodiment, the method may further comprise, upon identifying the first word supporting a dynamic shortcut command in the shortcut command name of the shortcut command name and the command, notifying the user that the dynamic shortcut command may be generated when the first word is added to the command.

According to an embodiment, the method may further comprise, upon identifying the first word supporting a dynamic shortcut command in the command of the shortcut command name and the command, notifying the user that the dynamic shortcut command may be generated when the first word is added to the shortcut command name.

According to an embodiment, the method may further comprise displaying an indicator for generating the dynamic shortcut command in a shortcut command generation mode, displaying at least one piece of type information that may be used as the dynamic shortcut command and at least one word included in each of the at least one piece of type information when the indicator is moved to a field of the shortcut command name, including the first type information selected from among the at least one piece of type information in the shortcut command name and the command and displaying the shortcut command name and the command, and when it is selected to store a shortcut command, storing the shortcut command name and the command including the selected first type information, as the first dynamic shortcut command, and storing at least one word included in the selected first type information as the first dynamic variable word.

According to an embodiment, the method may further comprise displaying a shortcut command name and a command of a dynamic shortcut command registered in a shortcut command identification mode, and when the first type information for the first dynamic variable word is selected from the shortcut command name or the command, displaying at least one first dynamic variable word included in the first type information.

According to an embodiment, executing the task may include, when the user utterance is determined to be the first dynamic shortcut command, changing the first dynamic variable word included in the user utterance into the first type information for the first dynamic variable word, and detecting a shortcut command name including the first type information for the dynamic variable word among at least one shortcut command name stored in a first DB of the memory.

According to an embodiment, the method may further comprise detecting a command associated with the detected shortcut command name, changing the first type information for the first dynamic variable word included in the detected command into the first dynamic variable word included in the user utterance, and executing a task corresponding to the changed command including the first dynamic variable word.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the disclosure, a method performing shortcut command in an electronic device may receive a speech signal, as an analog signal, via, e.g., a microphone, and convert the speech part into readable text using an automatic speech recognition (ASR) model. The user's intent of utterance may be obtained by interpreting the text using a natural language understanding (NLU) model. The ASR model or NLU model may be an artificial intelligence model. The artificial intelligence model may be processed by an artificial intelligence-dedicated processor designed in a hardware structure specified for artificial intelligence model processing. The artificial intelligence model may be created by training. Here, "created by training" means that a predefined operation rule or artificial intelligence model configured to achieve a desired feature (or goal) is created by training a default artificial intelligence model with multiple pieces of training data and a training algorithm. The artificial intelligence model may include a plurality of neural network layers. Each of the plurality of neural network layers includes a plurality of weight values and performs neural network computation by computation between the result of computation by a previous layer and the plurality of weight values.

Language understanding is a technique for recognizing and applying/processing human language/text and includes, e.g., natural language processing, machine translation, dialog system, question answering, or speech recognition/synthesis.

The invention claimed in:

1. An electronic device, comprising:
   a memory for storing at least one dynamic shortcut command;
   a display; and
   a processor operatively connected with the memory and the display, the processor configured to:
   store a first dynamic shortcut command comprising first type information for at least one first dynamic variable word in the memory,
   when acquiring a user utterance, detect the first dynamic shortcut command in the memory based on the at least one first dynamic variable word included the user utterance,
   change the first type information included in the detected first dynamic shortcut command into the at least one first dynamic variable word included in the user utterance, and
   execute a task corresponding to a changed first dynamic shortcut command comprising the at least one first dynamic variable word included in the user utterance.

2. The electronic device of claim 1, wherein the processor is further configured to:
   identify input of a shortcut command name and a command in a shortcut command generation mode,
   notify a user that a dynamic shortcut command can be generated upon identifying a first word supporting the dynamic shortcut command in the shortcut command name and the command,
   upon receiving consent to generate the dynamic shortcut command from the user, detect at least one second word having a same first type information as the first word,
   determine that the first word and the at least one second word are the at least one first dynamic variable word that can be used in a dynamic shortcut command, and
   based on a selection to store a shortcut command, store the shortcut command name and the command comprising the first type information for the at least one first dynamic variable word, instead of the first word, as the first dynamic shortcut command in a first database (DB) of a memory and store the first word and the at least one second word as the at least one first dynamic variable word in a second DB of the memory.

3. The electronic device of claim 2, wherein the processor is further configured to:
   display the at least one second word through the display, and
   when a second word is selected by the user from among the at least one second word, determine that the first word and the selected second word are the at least one first dynamic variable word.

4. The electronic device of claim 2, wherein the processor is further configured to, upon identifying the first word supporting a dynamic shortcut command in the shortcut command name of the shortcut command name and the command, notify the user that the dynamic shortcut command can be generated when the first word is added to the command.

5. The electronic device of claim 2, wherein the processor is further configured to, upon identifying the first word supporting a dynamic shortcut command in the command of the shortcut command name and the command, notify the user that the dynamic shortcut command can be generated when the first word is added to the shortcut command name.

6. The electronic device of claim 1, wherein the processor is further configured to:
   display an indicator for generating the dynamic shortcut command in a shortcut command generation mode,
   display at least one piece of type information that can be used as the dynamic shortcut command and at least one word included in each of the at least one piece of type information when the indicator is moved to a field of a shortcut command name,
   include the first type information selected from among the at least one piece of type information in the shortcut command name and the command and display the shortcut command name and the command, and
   based on a selection to store a shortcut command, store the shortcut command name and the command comprising the selected first type information, as the first dynamic shortcut command, and store at least one word included in the selected first type information as the first dynamic variable word.

7. The electronic device of claim 1, wherein the processor is further configured to:
   display a shortcut command name and a command of a dynamic shortcut command registered in a shortcut command identification mode, when the first type information for the at least one first dynamic variable word is selected from the shortcut command name or the command, display at least one first dynamic variable word included in the first type information.

8. The electronic device of claim 1, wherein the processor is further configured to:
   when the user utterance is determined to be the first dynamic shortcut command, change the at least one first dynamic variable word included in the user utterance into the first type information for the at least one first dynamic variable word,
   detect a shortcut command name including the first type information for the at least one first dynamic variable word among at least one shortcut command name stored in a first DB of the memory,
   detect a command associated with the detected shortcut command name,
   change the first type information for the at least one first dynamic variable word included in the detected command into the at least one first dynamic variable word included in the user utterance, and
   execute a task corresponding to a changed command comprising the first dynamic variable word.

9. A method for performing a shortcut command by an electronic device, the method comprising:
   storing a first dynamic shortcut command including first type information for at least one first dynamic variable word in memory of the electronic device,
   when acquiring a user utterance, detecting the first dynamic shortcut command in memory based on the at least one first dynamic variable word included the user utterance,
   changing the first type information included in the detected first dynamic shortcut command into the at least one first dynamic variable word included in the user utterance, and
   executing a task corresponding to a changed first dynamic shortcut command including the at least one first dynamic variable word included in the user utterance.

10. The method of claim 9, further comprising:
identifying input of a shortcut command name and a command in a shortcut command generation mode;
notifying a user that a dynamic shortcut command can be generated upon identifying a first word supporting the dynamic shortcut command in the shortcut command name and the command;
upon receiving consent to generate the dynamic shortcut command from the user, detecting at least one second word having a same first type information as the first word;
determining that the first word and the at least one second word are the at least one first dynamic variable word that can be used in a dynamic shortcut command; and
based on a selection to store a shortcut command, storing the shortcut command name and the command comprising the first type information for the at least one first dynamic variable word, instead of the first word, as the first dynamic shortcut command a first database (DB) of a memory and storing the first word and the at least one second word as the at least one first dynamic variable word in a second DB of the memory.

11. The method of claim 10, further comprising:
displaying the at least one second word through a display; and
when a second word is selected by the user from among the at least one second word, determining that the first word and the selected second word are the at least one first dynamic variable word.

12. The method of claim 10, further comprising, upon identifying the first word supporting a dynamic shortcut command in the shortcut command name of the shortcut command name and the command, notifying the user that the dynamic shortcut command can be generated when the first word is added to the command.

13. The method of claim 10, further comprising:
displaying an indicator for generating the dynamic shortcut command in a shortcut command generation mode;
displaying at least one piece of type information that can be used as the dynamic shortcut command and at least one word included in each of the at least one piece of type information when the indicator is moved to a field of a shortcut command name;
including the first type information selected from among the at least one piece of type information in the shortcut command name and the command and displaying the shortcut command name and the command; and
based on a selection to store a shortcut command, storing the shortcut command name and the command comprising the selected first type information, as the first dynamic shortcut command, and storing at least one word included in the selected first type information as the at least one first dynamic variable word.

14. The method of claim 9, further comprising:
displaying a shortcut command name and a command of a dynamic shortcut command registered in a shortcut command identification mode; and
when the first type information for the at least one first dynamic variable word is selected from the shortcut command name or the command, displaying at least one first dynamic variable word included in the first type information.

15. The method of claim 9, wherein the executing of the task comprises:
when the user utterance is determined to be the first dynamic shortcut command, changing the at least one first dynamic variable word included in the user utterance into the first type information for the at least one first dynamic variable word;
detecting a shortcut command name including the first type information for the at least one first dynamic variable word among at least one shortcut command name stored in a first DB of the memory,
detecting a command associated with the detected shortcut command name;
changing the first type information for the first dynamic variable word included in the detected command into the first dynamic variable word included in the user utterance; and
executing a task corresponding to a changed command including the at least one first dynamic variable word.

\* \* \* \* \*